United States Patent
Watanabe et al.

(10) Patent No.: US 8,031,570 B2
(45) Date of Patent: Oct. 4, 2011

(54) OPTICAL DISK UNIT AND DRIVING METHOD THEREFOR

(75) Inventors: Katsuya Watanabe, Nara (JP); Rie Takahashi, Osaka (JP); Takashi Kishimoto, Nara (JP); Hiroshige Ishibashi, Osaka (JP)

(73) Assignee: Panasonic Corporation, Osaka (JP)

( * ) Notice: Subject to any disclaimer, the term of this patent is extended or adjusted under 35 U.S.C. 154(b) by 292 days.

(21) Appl. No.: 11/720,440

(22) PCT Filed: Jun. 16, 2006

(86) PCT No.: PCT/JP2006/312131
§ 371 (c)(1),
(2), (4) Date: May 30, 2007

(87) PCT Pub. No.: WO2007/004406
PCT Pub. Date: Jan. 11, 2007

(65) Prior Publication Data
US 2009/0147639 A1  Jun. 11, 2009

(30) Foreign Application Priority Data
Jun. 30, 2005  (JP) .................... 2005-191574

(51) Int. Cl.
*G11B 20/18* (2006.01)
(52) U.S. Cl. .................... 369/53.2; 369/53.37
(58) Field of Classification Search .............. None
See application file for complete search history.

(56) References Cited

U.S. PATENT DOCUMENTS
2003/0112870 A1* 6/2003 Fukuda et al. ........... 375/240.12
2004/0037197 A1   2/2004 Fujiune et al.
2004/0130988 A1* 7/2004 Weng et al. .................. 369/53.2
2004/0224041 A1  11/2004 Morishima
2005/0117465 A1   6/2005 Kishimoto et al.
(Continued)

FOREIGN PATENT DOCUMENTS
JP  09-017106  1/1997
(Continued)

OTHER PUBLICATIONS

International Search Report for corresponding Application No. PCT/JP2006/312131 mailed Sep. 26, 2006.

(Continued)

*Primary Examiner* — Christopher Lamb
(74) *Attorney, Agent, or Firm* — Renner, Otto, Boisselle & Sklar, LLP

(57) ABSTRACT

An optical disk drive according to the present invention has the ability to read data from multiple types of optical disks, each of which includes at least one information storage layer. The drive includes: a driving mechanism 120, which is loaded with a selected one of the optical disks of the multiple types and which rotates the optical disk 102; an optical pickup 30 for irradiating the optical disk 102, which has been loaded into the driving mechanism 120, with a converged light beam, thereby generating an electrical signal based on light that has been reflected from the optical disk 102; and a control section (ODC 50) for controlling operations of the driving mechanism 120 and the optical pickup 30. The control section 50 includes a right/wrong side determining section for determining, by reference to the electrical signal generated by the optical pickup 30, whether or not the optical disk 102 has been loaded into the driving mechanism 120 with the other surface opposed to the optical pickup 30.

18 Claims, 15 Drawing Sheets

U.S. PATENT DOCUMENTS

2005/0265145 A1 * 12/2005 Nakane et al. ............ 369/44.27

FOREIGN PATENT DOCUMENTS

| JP | 10-112068 | 4/1998 |
| --- | --- | --- |
| JP | 10-177761 | 6/1998 |
| JP | 10-326450 | 12/1998 |
| JP | 2004-111028 | 4/2004 |
| JP | 2004-273037 | 9/2004 |
| JP | 2005-149703 | 6/2005 |
| JP | 2005-327422 | 11/2005 |
| JP | 2006-004528 | 1/2006 |

OTHER PUBLICATIONS

Form PCT/ISA/237and concise explanation.
Supplementary European Search Report for corresponding application No. 06766819.4 Issued Mar. 10, 2009.

* cited by examiner (a)

(b) FE (c) RE (a)

(b)

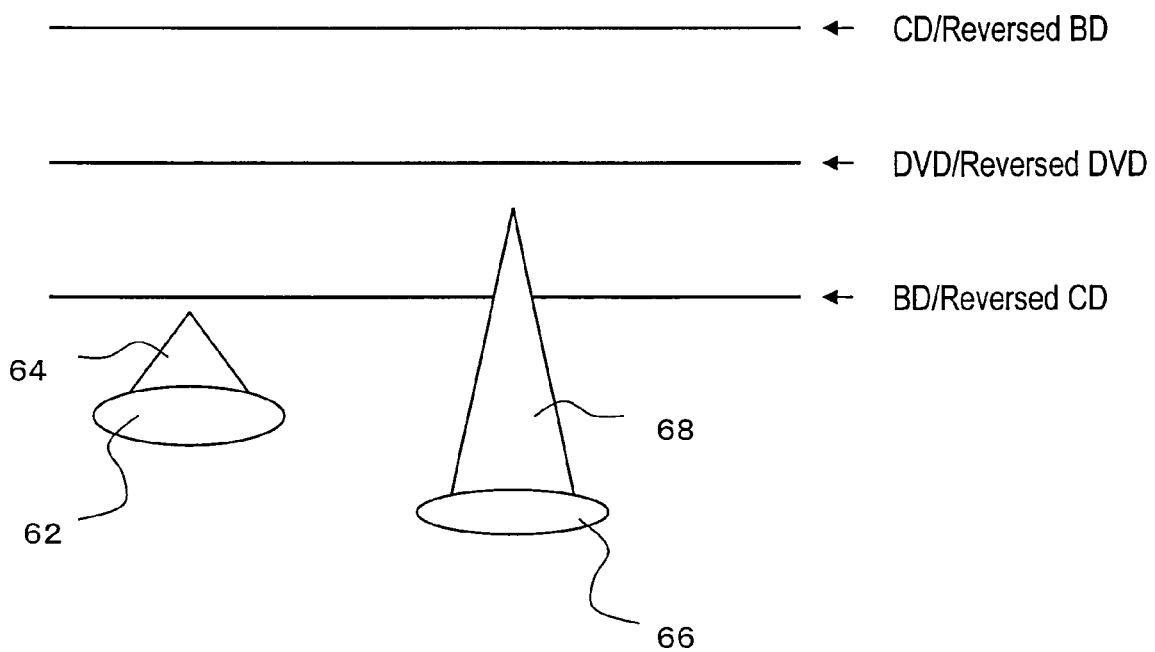

$47.8 < dzi < 48.0$ $dzo <= 116.2$ (a) In Reading CD Layer (b) In Reading DVD Layer (a)

(b)

OPTICAL DISK UNIT AND DRIVING METHOD THEREFOR

TECHNICAL FIELD

The present invention relates to an optical disk drive for reading and/or writing data from/on a spinning disklike information storage medium (which will be referred to herein as an "optical disk"). More particularly, the present invention relates to an optical disk drive that can properly recognize the type of a given optical disk that has been selected among multiple types of optical disks complying with mutually different standards.

BACKGROUND ART

In optical disk technologies, data can be read out from a rotating optical disk by irradiating the disk with a relatively weak light beam with a constant intensity, and detecting the light that has been modulated by, and reflected from, the optical disk.

On a read-only optical disk, information is already stored as pits that are arranged spirally during the manufacturing process of the optical disk. On the other hand, on a rewritable optical disk, a recording material film, from/on which data can be read and written optically, is deposited by an evaporation process, for example, on the surface of a base material on which tracks with spiral lands or grooves are arranged. In writing data on such a rewritable optical disk, data is written there by irradiating the optical disk with a light beam, of which the optical power has been changed according to the data to be written, and locally changing the property of the recording material film.

It should be noted that the depth of the pits, the depth of the tracks, and the thickness of the recording material film are all smaller than the thickness of the optical disk base material. For that reason, those portions of the optical disk, where data is stored, define a two-dimensional plane, which is sometimes called an "information storage plane". However, considering that such an "information storage plane" actually has a physical dimension in the depth direction, too, the term "information storage plane" will be replaced herein by another term "information storage layer". Every optical disk has at least one such information storage layer. Optionally, a single information storage layer may actually include a plurality of layers such as a phase-change material layer and a reflective layer.

To read data that is stored on a recordable optical disk or to write data on such an optical disk, the light beam always needs to maintain a predetermined converging state on a target track on an information storage layer. For that purpose, a "focus control" and a "tracking control" are required. The "focus control" means controlling the position of an objective lens perpendicularly to the information storage layer (which direction will be referred to herein as a "substrate depth direction") such that the focus position of the light beam is always located on the information storage layer. On the other hand, the "tracking control" means controlling the position of the objective lens along the radius of a given optical disk (which direction will be referred to herein as a "disk radial direction") such that the light beam spot is always located right on a target track.

Various types of optical disks such as DVD (digital versatile disc)-ROM, DVD-RAM, DVD-RW, DVD-R, DVD+RW and DVD+R have become more and more popular these days as storage media on which a huge amount of information can be stored at a high density. Meanwhile, CDs (compact discs) are still popular now. Currently, next-generation optical disks, including Blu-ray disc (BD), which can store an even greater amount of information at a much higher density, are under development, and some of them have already been put on the market.

The cross-sectional structures of these optical disks change from one type to another. For example, these optical disks are different in physical track structure, track pitch, and depth of the information storage layer (i.e., the distance from the surface of the optical disk, through which the incoming light enters the disk, to the information storage layer). To read or write data properly from/on these multiple types of optical disks with those various physical structures, the information storage layer of each of these optical disks needs to be irradiated with a light beam with an appropriate wavelength by using an optical system that has a numerical aperture (NA) associated with the specific type of the disk.

FIG. 1 is a perspective view schematically illustrating an optical disk 200. Just for reference, an objective lens (converging lens) 20 and a light beam 22 that has been converged by this objective lens 20 are shown in FIG. 1. The light beam 22 passes through the light-incoming side of the optical disk 200 and is converged onto the information storage layer, thereby forming a light beam spot on the information storage layer.

FIGS. 2(a), 2(b) and 2(c) schematically illustrate cross sections of a CD, a DVD and a BD, respectively. Each of these optical disks shown in FIG. 2 has a principal surface (i.e., light-incoming side) 200a and a back surface (i.e., a label side) 200b and includes at least one information storage layer 14 between these surfaces. On the back surface 200b of the optical disk, arranged is a label layer 18 on which the title, graphics, and so on have been printed. Any of these optical disks has an overall thickness of 1.2 mm and a diameter of 12 cm. For the sake of simplicity, pits, grooves and other unevenness are not shown in FIG. 2 and the reflective layer is not shown there, either.

As shown in FIG. 2(a), the CD's information storage layer 14 is located at a depth of about 1.1 mm as measured from the principal surface 200a. To read data from the CD's information storage layer 14, a near-infrared laser beam (with a wavelength of 785 nm) needs to be converged such that its focal point is located right on the information storage layer 14 by focus control. The objective lens for use to converge the light beam needs to have a numerical aperture (NA) of approximately 0.5.

As shown in FIG. 2(b), the DVD's information storage layer 14 is located at a depth of approximately 0.6 mm as measured from the principal surface 200a. In an actual DVD, two substrates, each having a thickness of approximately 0.6 mm, are boned together with an adhesive layer. In an optical disk with two information storage layers 14, the respective distances from the principal surface 200a to the information storage layers 14 are approximately 0.57 mm and approximately 0.63 mm, respectively. That is to say, those two information storage layers are located very close to each other. That is why only one information storage layer 14 is shown in FIG. 2(b), no matter how many information storage layers 14 are actually included. To read and write data from/on the DVD's information storage layer 14, a red laser beam (with a wavelength of 660 nm) needs to be converged such that its focal point is located right on the information storage layer 14 by focus control. The objective lens for use to converge the light beam needs to have a numerical aperture (NA) of approximately 0.6.

As shown in FIG. 2(c), the BD includes a thin coating layer (light transmitting layer) with a thickness of approximately 100 μm on the principal surface 200a and its information storage layer 14 is located at a depth of about 0.1 mm as measured from the principal surface 200a. To read data from the BD's information storage layer 14, a blue violet laser beam (with a wavelength of 405 nm) needs to be converged such that its focal point is located right on the information storage layer 14 by focus control. The objective lens for use to converge the light beam needs to have a numerical aperture (NA) of approximately 0.85.

Currently, these various types of optical disks are on the market and used extensively. Under the circumstances like these, a single optical disk drive should read from, and write to, as many types of optical disks as possible. For that purpose, the optical disk drive should include a light source and an optical system, both of which can deal with multiple types of optical disks, and should appropriately recognize the type of the optical disk that has been loaded into the optical disk drive.

The optical disk drive disclosed in Patent Document No. 1 recognizes the type of the given optical disk by optically detecting the depth of the information storage layer of that optical disk. Portion (a) of FIG. 3 schematically illustrates how the gap between the principal surface 200a of the optical disk 200 and the objective lens 20 decreases gradually. This optical disk 200 includes a substrate 12, which is transparent to a light beam, an information storage layer 14 that has been formed on the substrate 12, and a protective layer (coating layer) 16 that covers the information storage layer 14. The optical disk 200 illustrated in portion (a) of FIG. 3 corresponds to a BD and the coating layer 16 has a thickness of about 0.1 mm. There is a label layer 18 on which an image, characters and so on are printed, on the back surface 200b of the optical disk. It should be noted that the thickness of the label layer 18 is not to scale.

Portion (a) of FIG. 3 illustrates a situation where the focus position of the light beam 22 is located on the surface 200a of the optical disk, a situation where the focal point of the light beam 22 is located on the information storage layer 14, and a situation where the focal point of the light beam 22 is located inside the substrate 12. Portion (b) of FIG. 3 schematically shows a focus error (FE) signal to be generated when the focus position of the light beam 22 varies with time. The FE signal changes so as to draw a small S-curve when the focal point of the light beam 22 passes the surface 200a of the optical disk 200. On the other hand, when the focal point of the light beam 22 passes the information storage layer 14 of the optical disk 200, the FE signal changes so as to draw large S-curves. Portion (c) of FIG. 3 schematically shows the amplitude of a radio frequency (RF) read signal to be generated when the focus position of the light beam 22 varies with time. It can be determined that the focal point of the light beam 22 is located on the information storage layer 14 when the amplitude of the RF signal shows a non-zero significant value and when the FE signal goes zero. If the focus servo is turned ON in such a situation, the position of the objective lens is controlled such that the FE signal is always equal to zero. Such an operation of turning the focus servo ON around the center of the S-curve of the FE signal (i.e., near the zero-cross point of the FE signal) when the S-curve is detected while a focus search is being carried out in search of the information storage layer 14 will be referred to herein as a "focus finding operation".

The position of the objective lens when the S-curve of the FE signal is detected can be determined by reference to the value or magnitude of the electrical signal being supplied to the actuator that is controlling the position of the objective lens. As a result, the depth of the information storage layer 14 can be detected, and eventually, the type of the given optical disk can be recognized by the depth of the information storage layer 14.

Patent Document No. 1: Japanese Patent Application Laid-Open Publication No. 2004-111028

DISCLOSURE OF INVENTION

Problems to be Solved by the Invention

FIGS. 4(a) and 4(b) illustrate situations where the focal point of a light beam is located on the information storage layer 14 of a properly loaded BD and on the information storage layer 14 of a properly loaded CD, respectively. On the other hand, FIG. 5(a) illustrates a situation where the focal point of a light beam is located on the information storage layer 14 of a BD that has been loaded upside down by mistake (which will be referred to herein as a "erroneously loaded BD"), while FIG. 5(b) illustrates a situation where the focal point of a light beam is located on the information storage layer 14 of a properly loaded CD.

As can be seen from these drawings, the depth of the information storage layer 14 of the erroneously loaded BD is close to that of the information storage layer 14 of the CD. The label layer 18 can transmit the light beam 22, and therefore, an FE signal may be detectable from the erroneously loaded BD. That is why according to the method of detecting the depth of the information storage layer 14 based on the FE signal, the erroneously loaded BD could be recognized as a CD by mistake.

On recognizing the erroneously loaded BD as a CD, the optical disk drive starts a read operation on a CD. More specifically, the optical disk drive performs a focus finding operation on the information storage layer 14 of the erroneously loaded BD using an objective lens for CDs, and then the spindle motor (not shown) starts to turn the erroneously loaded BD to move the objective lens in the disk radial direction.

However, the erroneously loaded BD has the label layer 18 closer to the objective lens (i.e., closer to the optical pickup). The label layer 18 is not designed so as to transmit the light beam to read and write data, and therefore, the pattern and characters drawn there may cause significant variations in light transmittance from one location to another. On top of that, the label layer 18 also has poor planarity. The infrared light beam for reading CDs would be transmitted through most of the label layer 18. However, the pattern, characters and so on may have been printed in the rest of the label layer 18 using a material that does not transmit the infrared light beam. If such a label layer 18 were facing the optical pickup, the focus control might fail to work properly and the objective lens would collide against the erroneously loaded BD that has just started to turn. Particularly if a BD objective lens is arranged adjacent to the CD objective lens, the BD objective lens may collide against the label layer 18 of the erroneously loaded BD easily because the BD objective lens projects closer to the optical disk inserted than the CD objective lens does.

A similar problem may also happen between a properly loaded BD and an erroneously loaded CD or between a properly loaded DVD and an erroneously loaded DVD.

An object of the present invention is to provide an optical disk drive that can avoid collision between the given optical disk and the lens appropriately by determining whether the optical disk has been loaded upside up or upside down.

Means for Solving the Problems

An optical disk drive according to the present invention has the ability to read data from multiple types of optical disks, each of which has one surface and the other surface and at least one information storage layer arranged between the one and the other surfaces. The drive includes: a driving mechanism, which is loaded with a selected one of the optical disks of the multiple types and which rotates the optical disk; an optical pickup for irradiating the optical disk, which has been loaded into the driving mechanism, with a converged light beam, thereby generating an electrical signal based on light that has been reflected from the optical disk; and a control section for controlling operations of the driving mechanism and the optical pickup. The control section includes a right/wrong side determining section for determining, by reference to the electrical signal generated by the optical pickup, whether or not the optical disk has been loaded into the driving mechanism with the other surface opposed to the optical pickup.

In one preferred embodiment, the control section changes the focal point of the light beam that has been converged by the optical pickup in a depth direction of the optical disk in the innermost area of the optical disk.

In a specific preferred embodiment, the innermost area of the optical disk is located between 21 mm and 26 mm away from the center of the optical disk.

In this particular preferred embodiment, the control section controls a focusing operation of the optical pickup such that the focal point of the light beam that has been converged by the optical pickup is located right on the information storage layer of the optical disk. After a focus servo control has been activated such that the focal point of the converged light beam is located on the information storage layer of the optical disk, the right/wrong side determining section makes the decision.

In a specific preferred embodiment, the right/wrong side determining section irradiates the optical disk with a light beam to read BDs, moves the optical pickup in a disk radial direction while the focus servo control is being activated, and sees if loss of focus control has occurred, thereby determining whether the optical disk is a properly loaded BD or an erroneously loaded CD.

In another specific preferred embodiment, the right/wrong side determining section irradiates the optical disk with a light beam to read BDs and detects a burst cutting area, thereby determining whether the optical disk is a properly loaded BD or an erroneously loaded CD.

In still another specific preferred embodiment, the right/wrong side determining section determines, by reference to a tracking error signal or a focus error signal generated by irradiating the optical disk with a light beam to read CDs, whether the optical disk is a properly loaded CD or an erroneously loaded BD.

In yet another specific preferred embodiment, the right/wrong side determining section irradiates the optical disk with a light beam to read CDs and detects a burst cutting area, thereby determining whether the optical disk is a properly loaded CD or an erroneously loaded BD.

In another preferred embodiment, after the optical disk has been recognized as a properly loaded CD, the focal point of the light beam is moved deeper into the optical disk, thereby reading data from a dual type optical disk.

In yet another preferred embodiment, the right/wrong side determining section irradiates the optical disk with a light beam to read DVDs, and moves the optical pickup in a disk radial direction while the focus servo control is being activated, thereby determining, by reference to a focus error signal or a tracking error signal, whether the optical disk is a properly loaded DVD or an erroneously loaded DVD.

In yet another preferred embodiment, the right/wrong side determining section irradiates the optical disk with a light beam to read DVDs, moves the optical pickup in a disk radial direction while the focus servo control is being activated, and sees if an address is readable from a user area of the optical disk, thereby determining whether the optical disk is a properly loaded DVD or an erroneously loaded DVD.

A method for driving an optical disk drive according to the present invention is designed to drive an optical disk drive having the ability to read data from multiple types of optical disks, each of which has one surface and the other surface and at least one information storage layer arranged between the one and the other surfaces. The method includes the steps of: (A) performing an operation to detect the information storage layer of the optical disk loaded; (B) performing a focus servo control such that the focal point of the light beam is located right on the information storage layer; and (C) determining whether or not the optical disk has been loaded upside down.

In one preferred embodiment, the step (A) is carried out with the focal point of the light beam set between 21 mm and 26 mm away from the center of the optical disk.

In another preferred embodiment, the step (B) is carried out with the focal point of the light beam set between 21 mm and 26 mm away from the center of the optical disk.

In still another preferred embodiment, the step (C) is carried out with the focal point of the light beam shifted in the disk radial direction.

In yet another preferred embodiment, the step (C) includes shifting the focal point of the light beam within the area, checking the focus servo control for any abnormality, and shifting the focal point of the light beam again out of the area if no abnormality has been detected.

Effects of the Invention

An optical disk drive according to the present invention includes a right/wrong side determining section for determining, by reference to an electrical signal generated by an optical pickup, whether or not an optical disk has been loaded into a driving mechanism with the wrong side opposed to the optical pickup. Thus, it is possible to avoid an unwanted situation where the optical pickup collides against an optical disk that has been loaded upside down by mistake and does some damage on the optical disk.

Such a problem will arise very often when two different types of optical disks such as BDs and CDs, of which the information storage layers are arranged substantially symmetrically in the depth direction, become popular. That is why the present invention is particularly effectively applicable to an optical disk drive including an optical pickup that is compatible with various types of optical disks including BDs and CDs.

Figure 1:
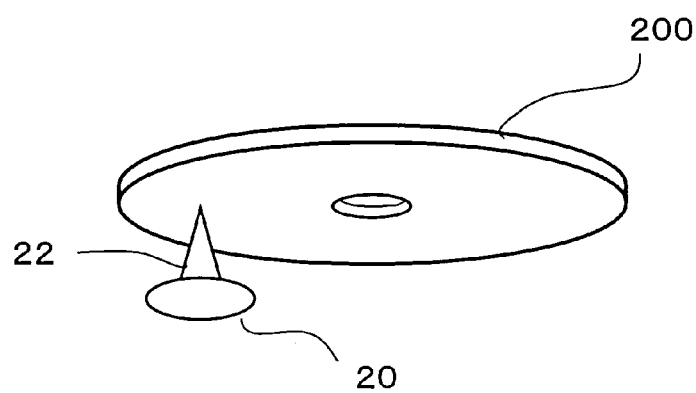
FIG. 1 is a perspective view schematically illustrating an optical disk 200.
Figure 2:
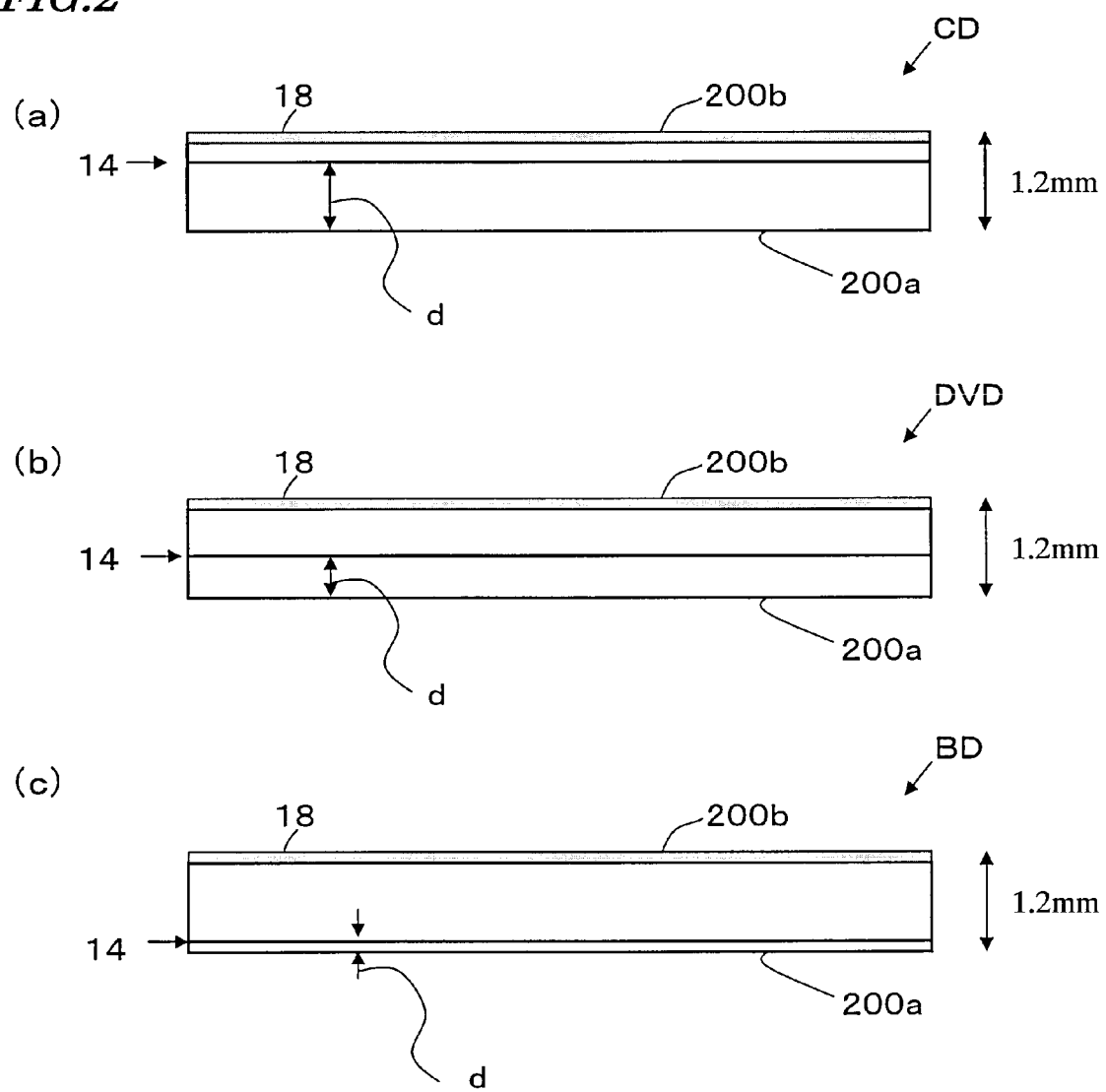
FIGS. 2(a), 2(b) and 2(c) schematically show cross sections of a CD, a DVD and a BD, respectively.
Figure 3:
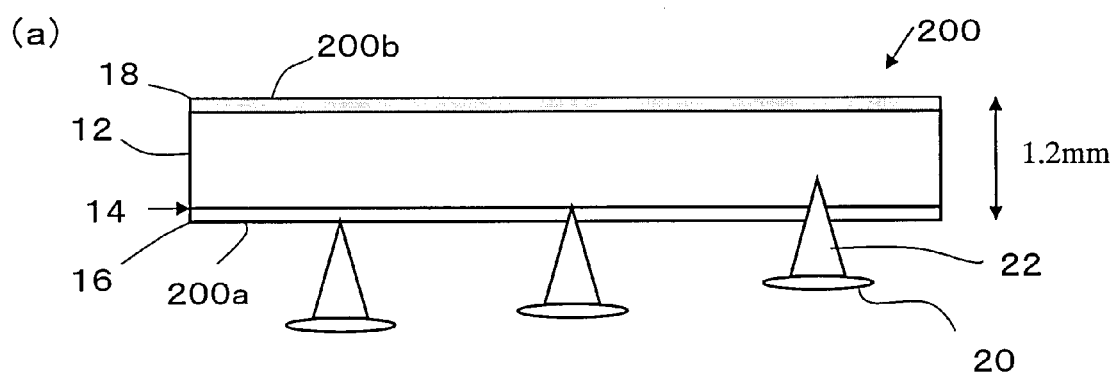
Figure 3:
Figure 3:

Portion (a) of FIG. 3 schematically illustrates how the gap between the surface 200a of the optical disk 200 and objective lens 20 gradually narrows;

Portion (b) of FIG. 3 schematically shows a focus error (FE) signal to be generated when the focus position of the light beam 22 varies with time; and Portion (c) of FIG. 3 schematically shows the amplitude of a radio frequency (RF) signal to be generated when the focus position of the light beam 22 varies with time.

Figure 4:
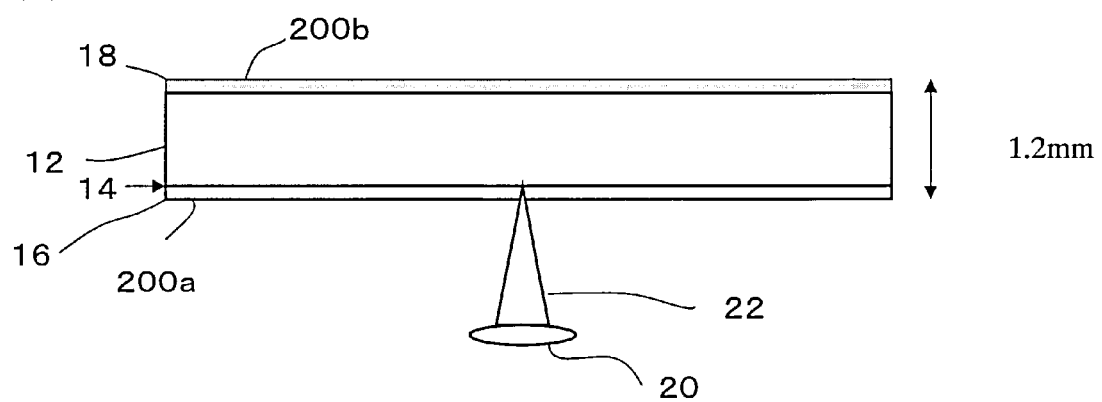
Figure 4:
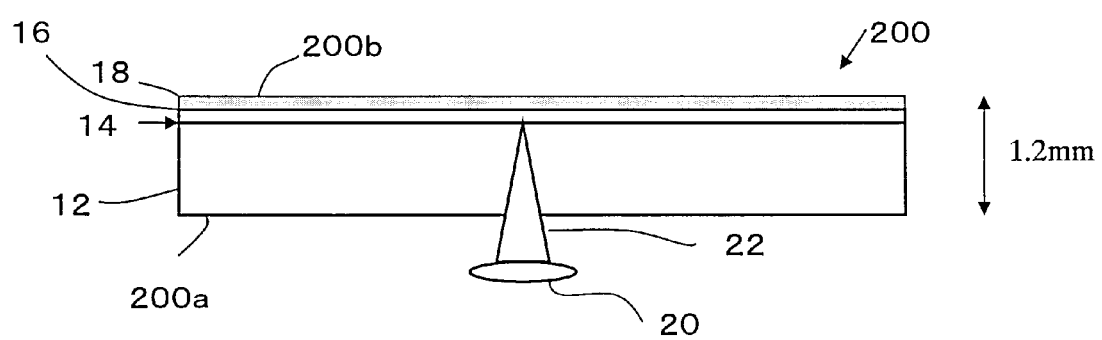

FIGS. 4(a) and 4(b) illustrate situations where the focal point of a light beam is located on the information storage layer 14 of a properly loaded BD and on the information storage layer 14 of a properly loaded CD, respectively.

Figure 5:
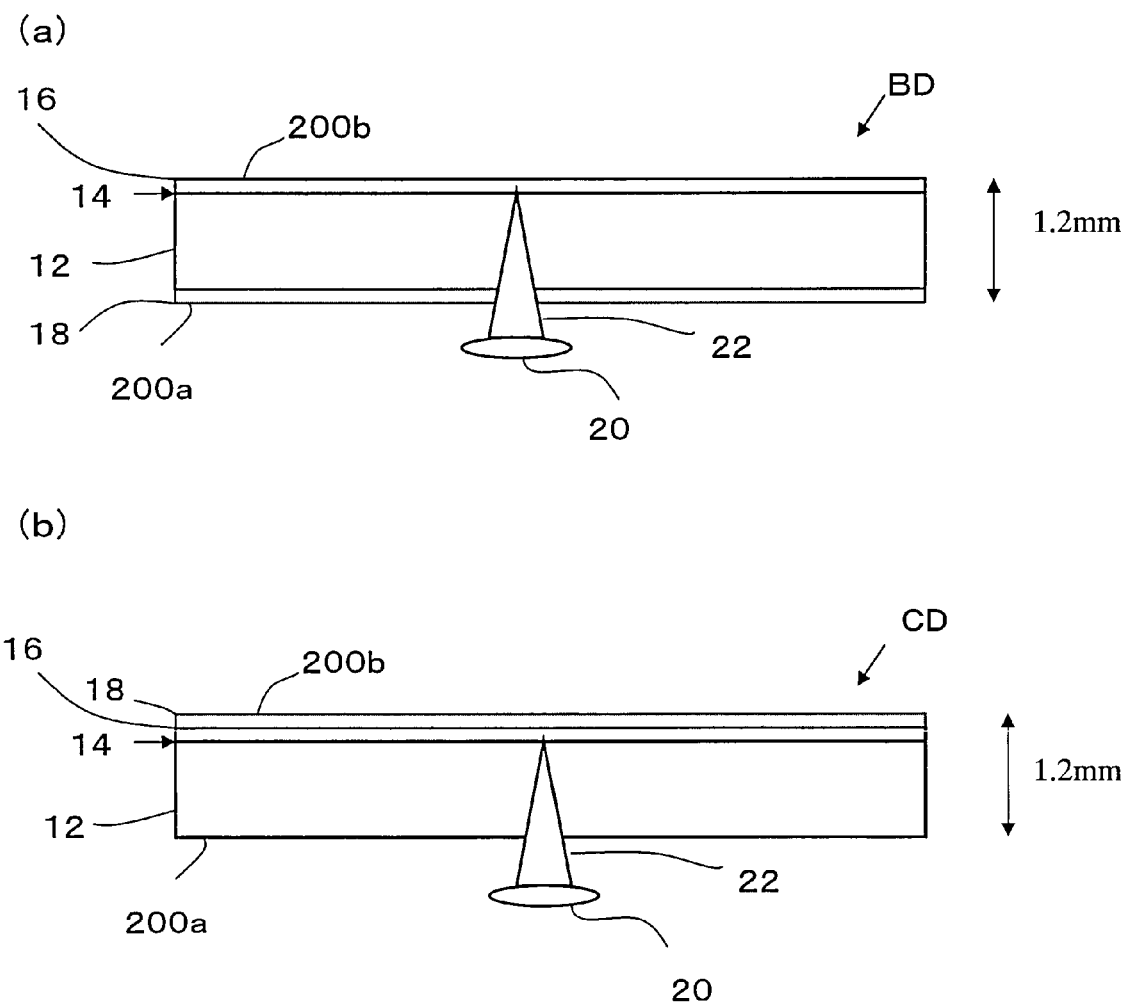

FIG. 5(a) illustrates a situation where the focal point of a light beam is located on the information storage layer 14 of an erroneously loaded BD, and FIG. 5(b) illustrates a situation where the focal point of a light beam is located on the information storage layer 14 of a properly loaded CD.

FIG. 6A schematically illustrates three information storage layers that are located at three different depths.

Figure 6B:
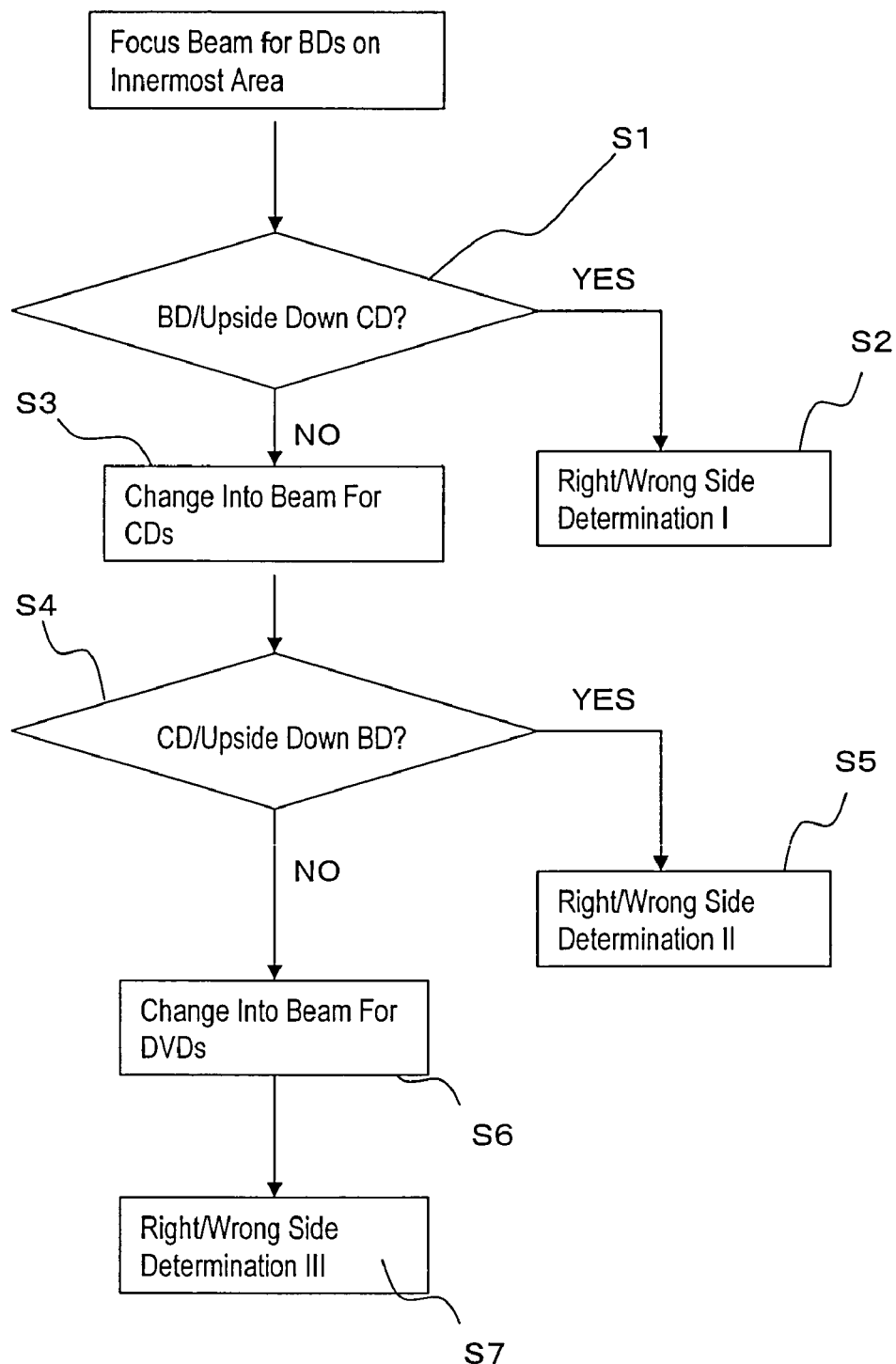

FIG. 6B is a flowchart outlining the initial determining operation.

Figure 7:
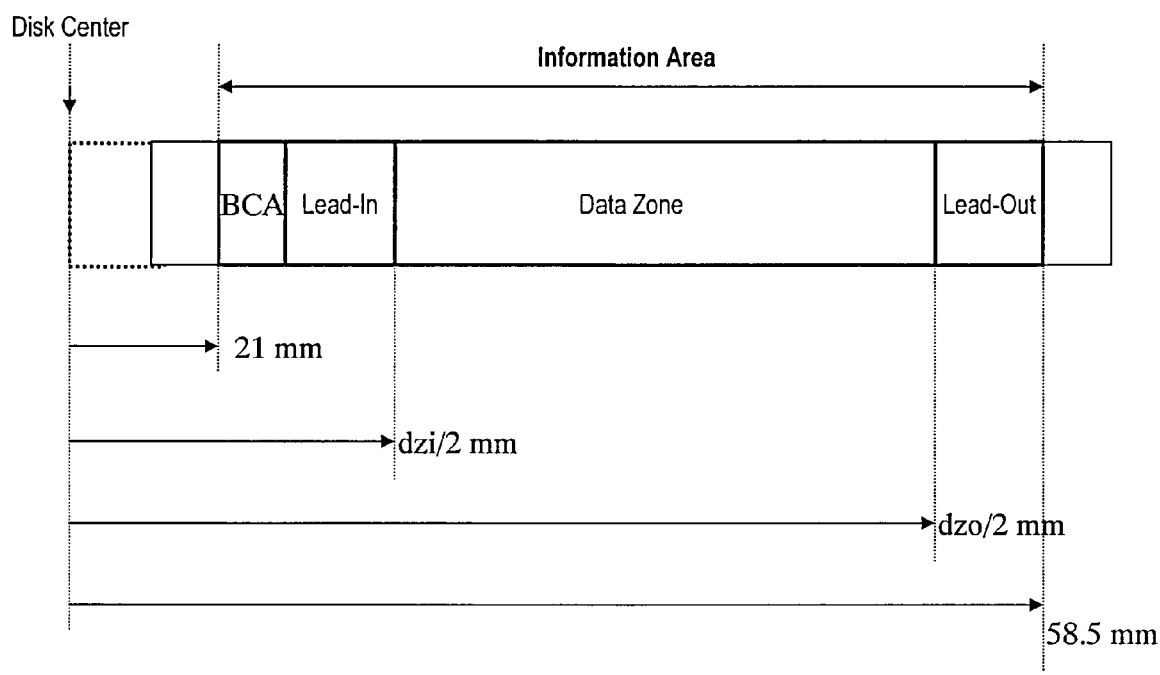

FIG. 7 schematically shows the ranges of respective storage areas on a BD by the distances as measured from the center of the disk.

Figure 8:
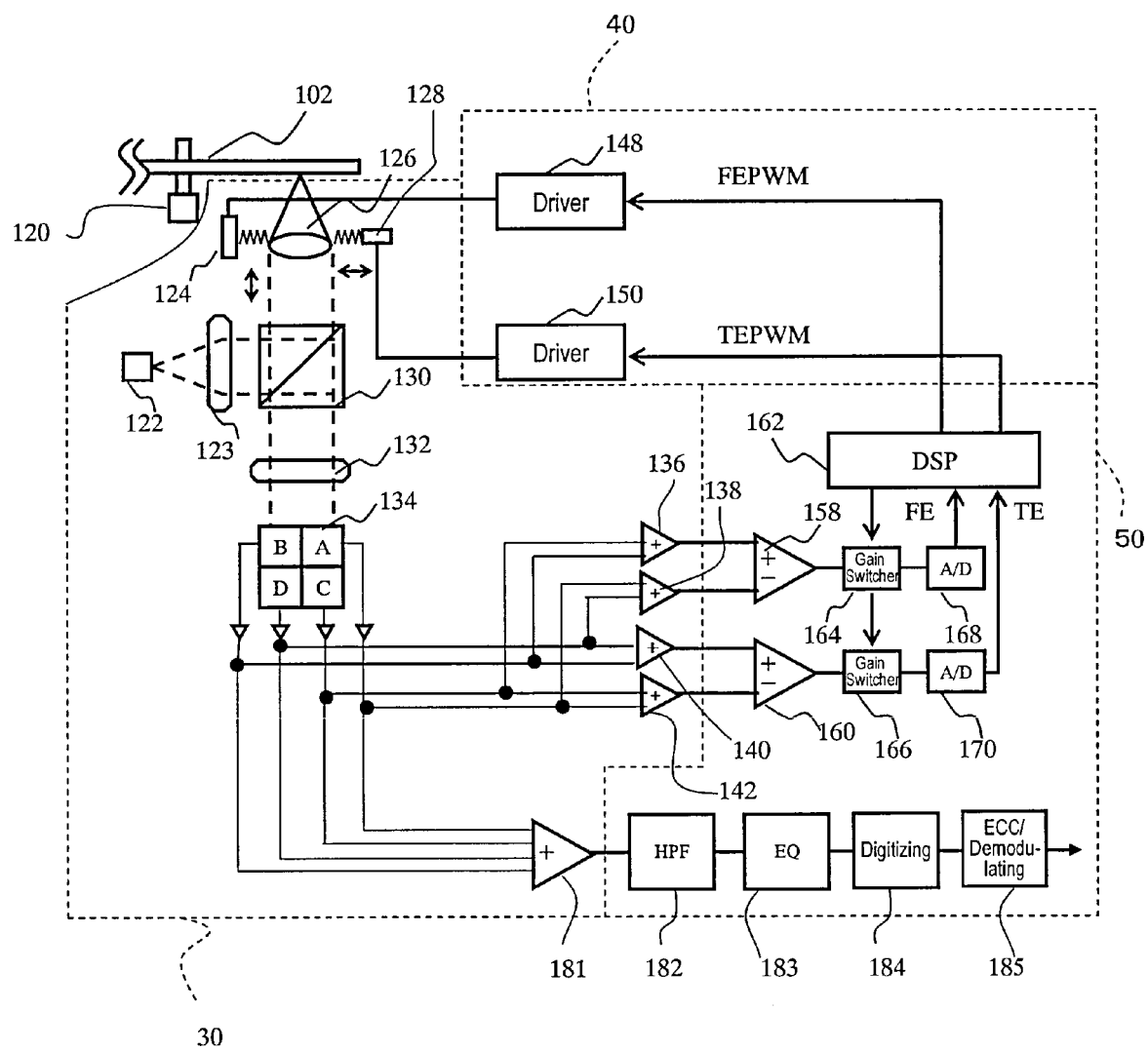

FIG. 8 shows an exemplary configuration for an optical disk drive according to a preferred embodiment of the present invention.

Figure 9A:
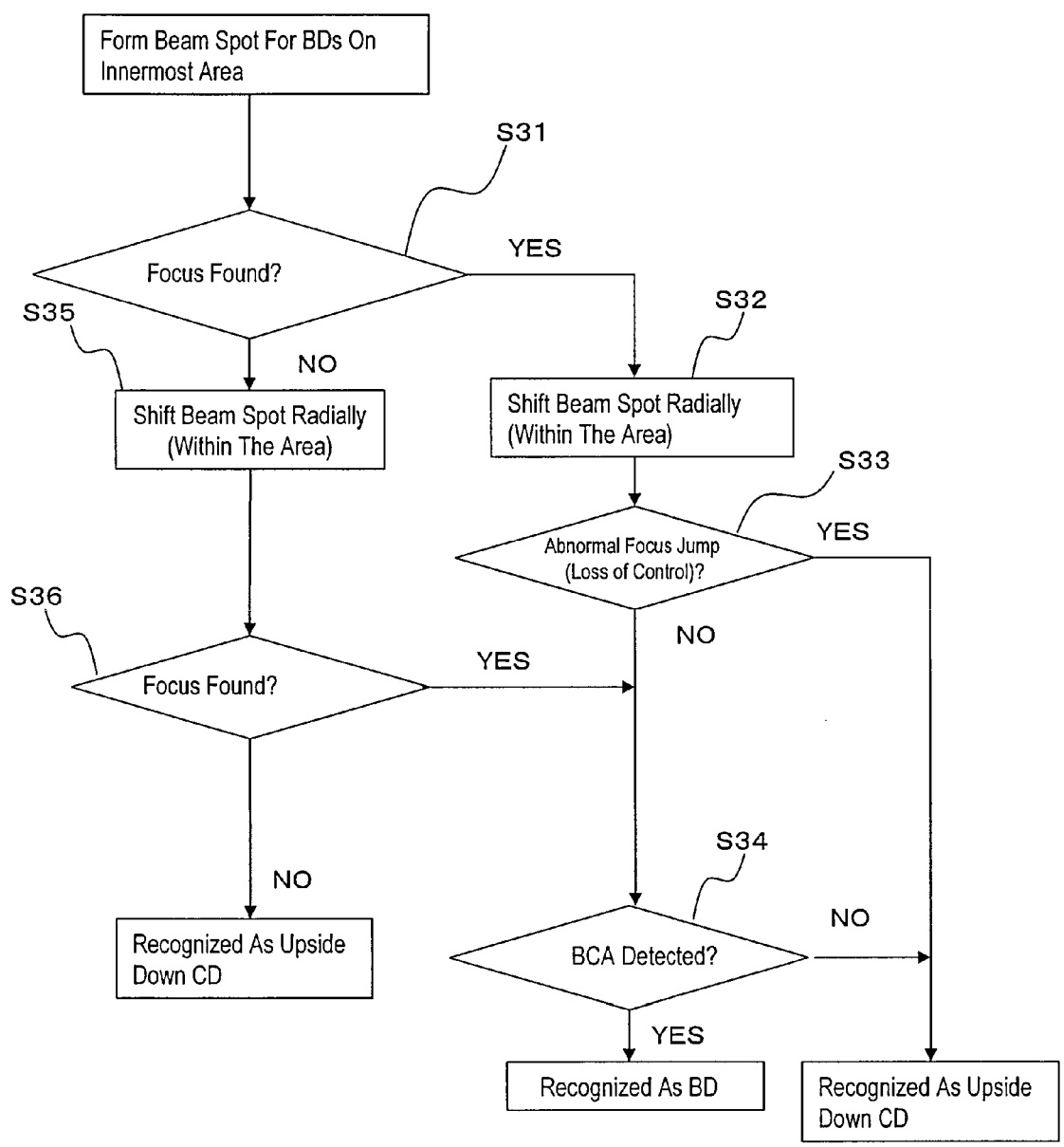

FIG. 9A is a flowchart showing a procedure for determining whether the given optical disk is an erroneously loaded CD or a properly loaded BD.

Figure 9B:
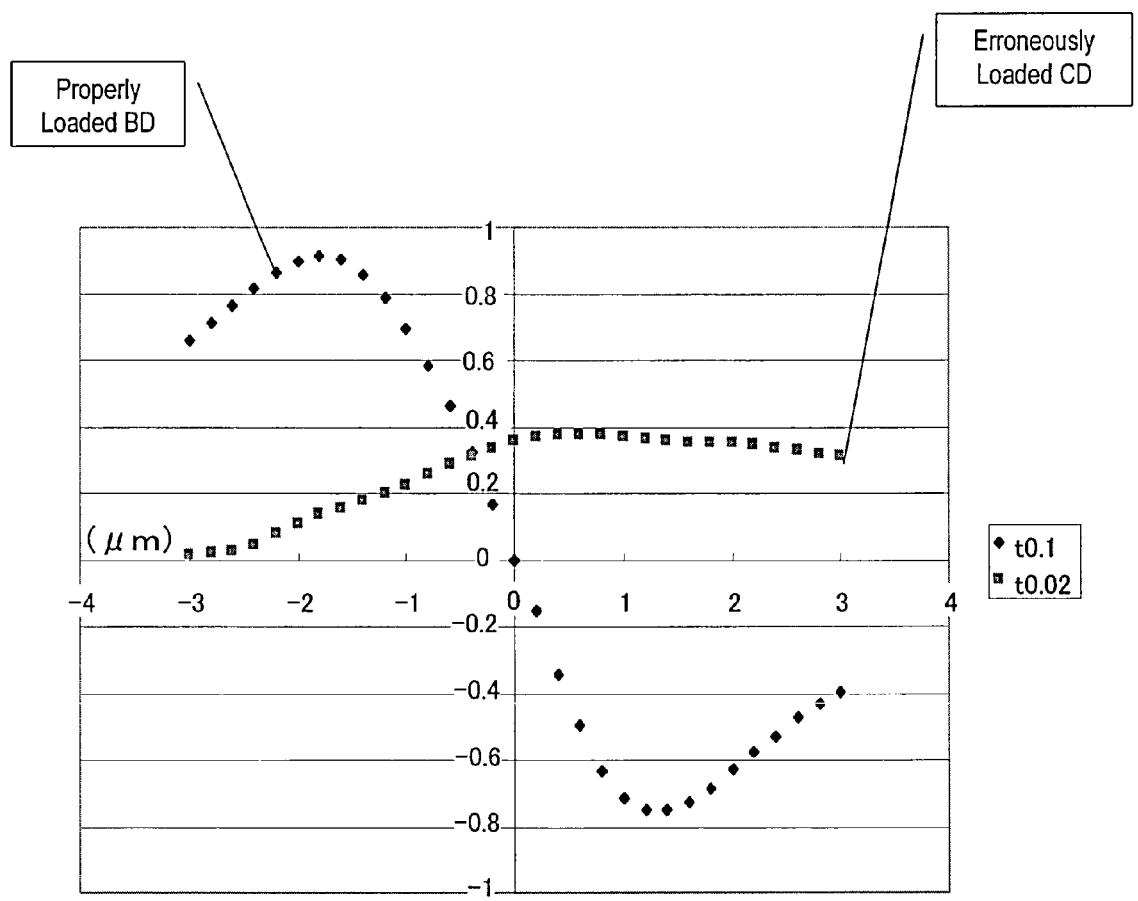

FIG. 9B is a graph showing the waveforms of focus error signals to be generated when the respective storage layers of a properly loaded BD and an erroneously loaded CD are irradiated with a light beam to read BDs.

Figure 9C:
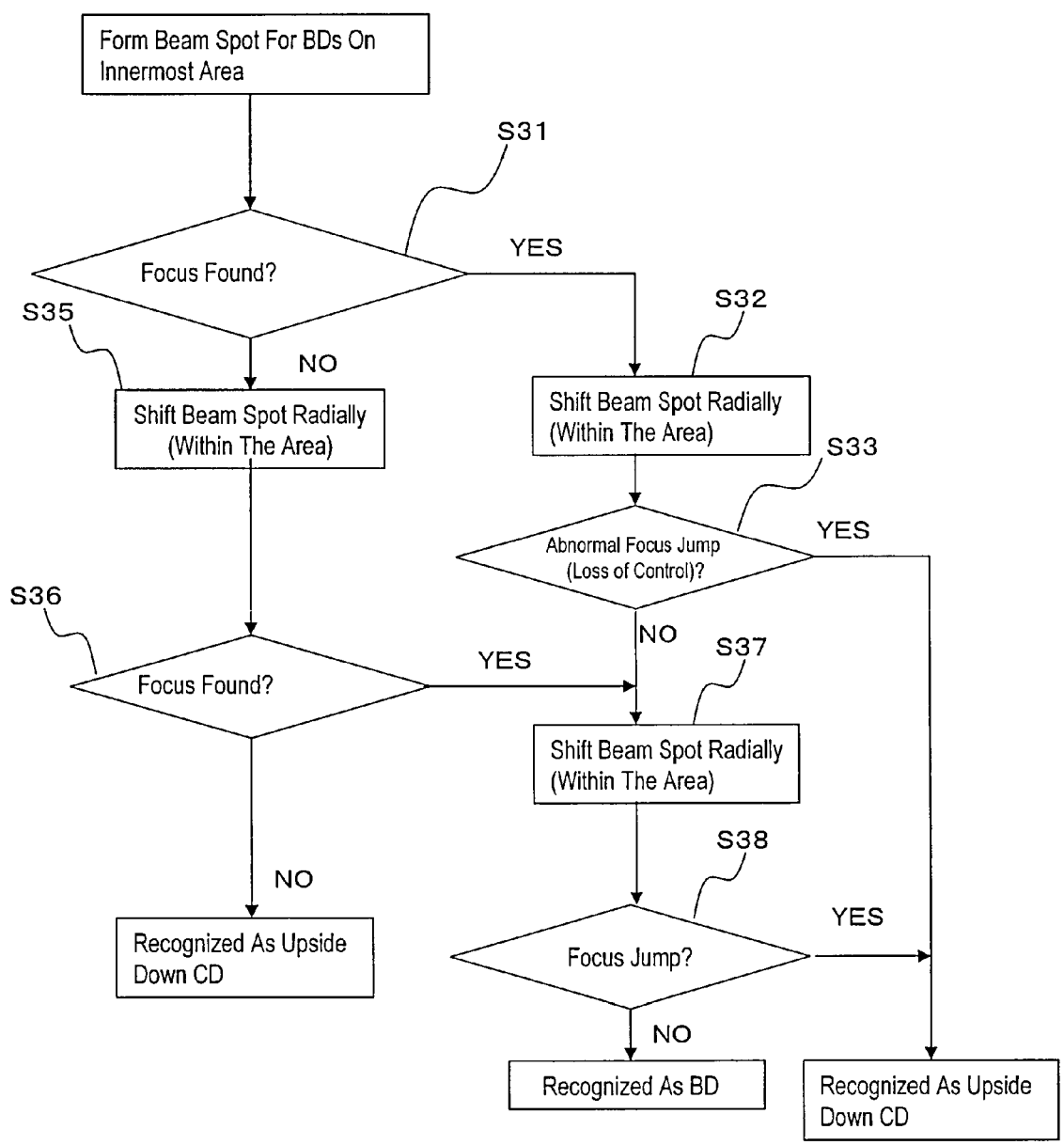

FIG. 9C is a flowchart showing another procedure for determining whether the given optical disk is an erroneously loaded CD or a properly loaded BD.

Figure 10A:
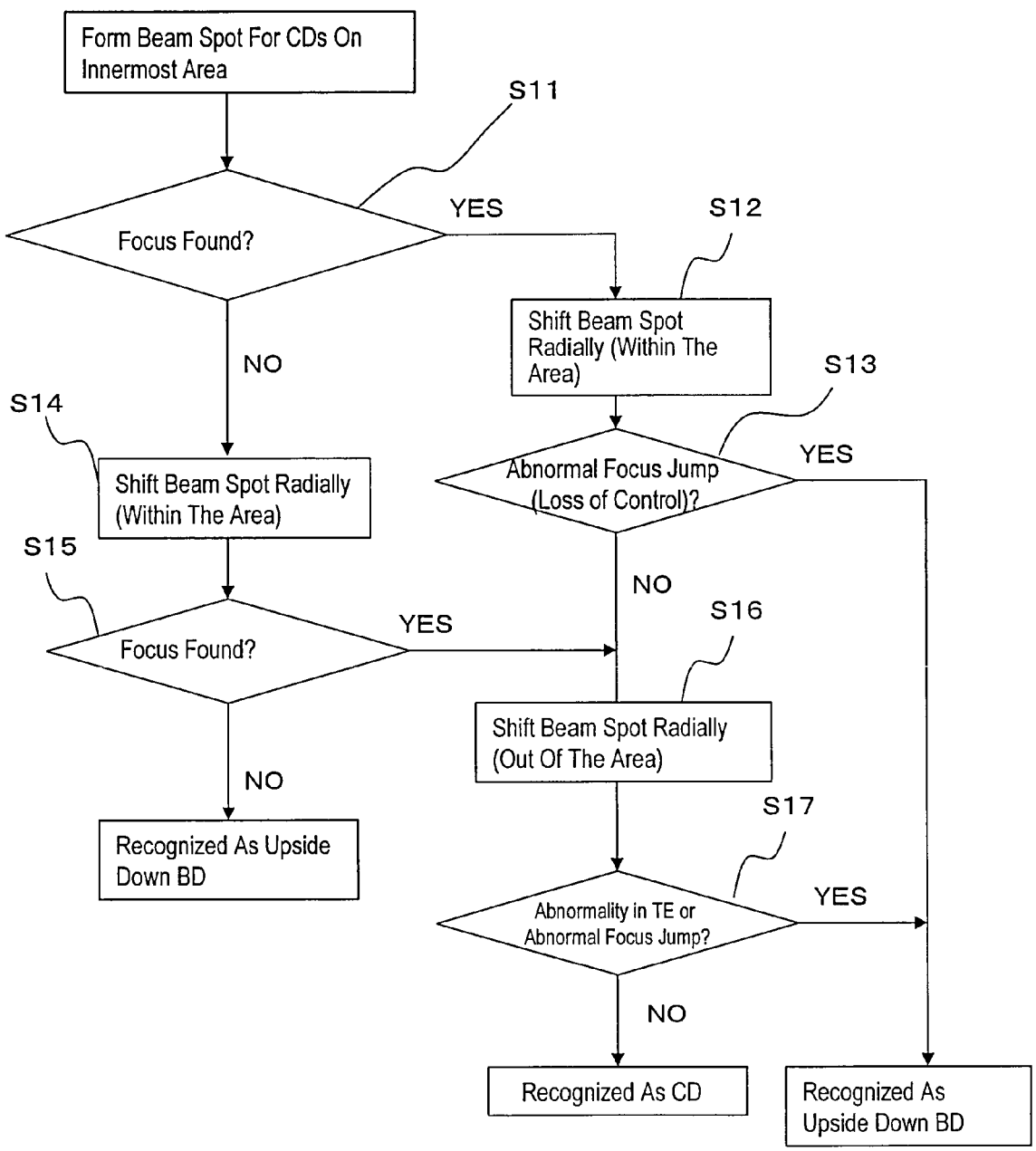

FIG. 10A is a flowchart showing a procedure for determining whether the given optical disk is an erroneously loaded BD or a properly loaded CD.

Figure 10B:
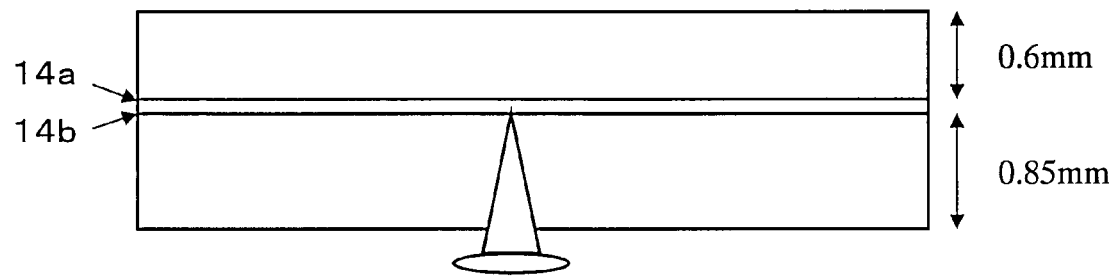
Figure 10B:
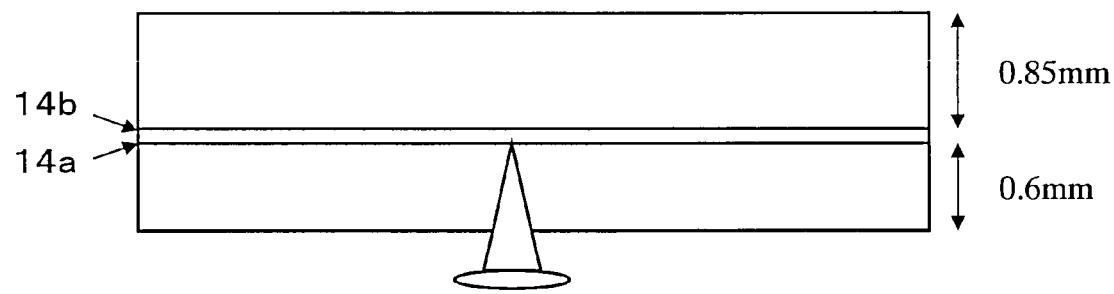

Portion (a) of FIG. 10B is a cross-sectional view illustrating how to load a dual type optical disk in reading data from the CD's storage layer thereof, while portion (b) of FIG. 10B is a cross-sectional view illustrating how to load the dual type optical disk in reading data from the DVD's storage layer thereof.

Figure 11:
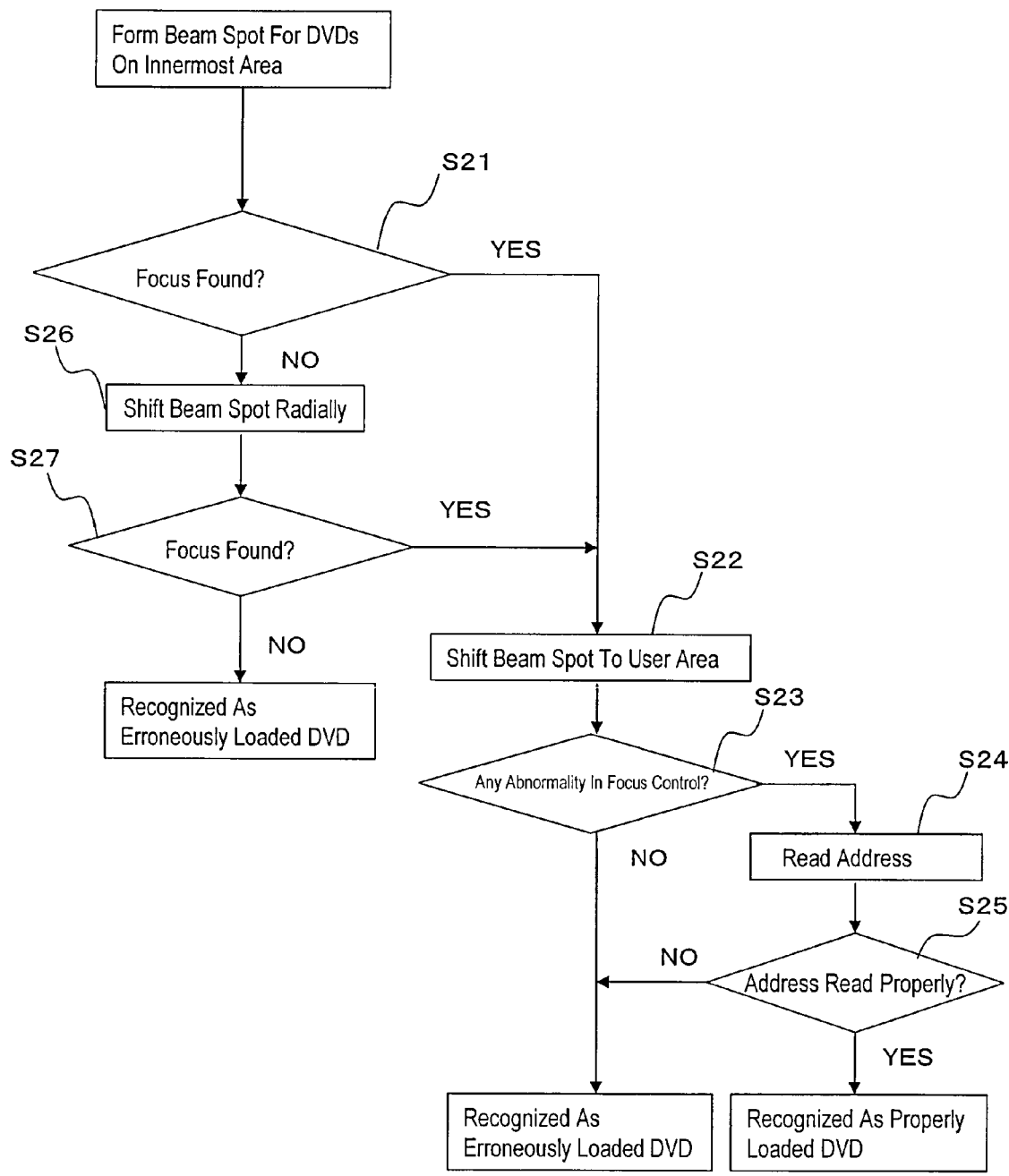

FIG. 11 is a flowchart showing a procedure for determining whether the given optical disk is an erroneously loaded DVD or a properly loaded DVD.

FIGS. 12(a) and 12(b) are respectively a perspective view and a top view illustrating an exemplary optical pickup.

DESCRIPTION OF REFERENCE NUMERALS 12 substrate
14 information storage plane
16 protective coating (light transmitting layer)
18 label layer
30 optical pickup
40 driving section
50 ODC
100 optical disk drive
102 optical disk
120 disk motor
122 light source
123 coupling lens
124 focus actuator
126 objective lens
128 tracking actuator
130 polarization beam splitter
132 condenser lens
134 photodetector
136 adder
138 adder
140 adder
142 adder
158 differential amplifier
160 differential amplifier
162 digital signal processor (DSP)
164 gain switcher
166 gain switcher
168 analog-to-digital (A/D) converter
170 analog-to-digital (A/D) converter
181 adder
184 information storage layer
200 optical disk
200a surface of optical disk
200b the other surface of optical disk (label side)

BEST MODE FOR CARRYING OUT THE INVENTION

An optical disk drive according to the present invention can read data from multiple types of optical disks with mutually different structures. Each of these optical disks has one surface and the other surface and at least one information storage layer arranged between the one and the other surfaces. The multiple types of optical disks typically include CDs, DVDs and BDs but may sometimes include CD/BD hybrid disks, BD/DVD hybrid disks and other types of optical disks.

Each of these optical disks has a structure from/on which data can be read and/or written by being irradiated with a light beam through its "surface". Therefore, "the other surface" of each optical disk functions as a label side, on which characters or a picture has been printed so as to be directly visible to the eye. That portion on the other surface of the optical disk, on which the characters or picture has been printed, will be referred to herein as a "label layer", no matter how thick it may be.

Just like a known optical disk drive such as a DVD player, the optical disk drive of the present invention also includes a driving mechanism such as a spindle motor for rotating the given optical disk. When the driving mechanism is loaded with one of the multiple types of optical disks that has been arbitrarily selected by the user, the operations to be described later are performed, thereby recognizing the type of the given optical disk.

The optical disk drive of the present invention further includes an optical pickup and a control section for controlling the operations of the driving mechanism and the optical pickup. The optical pickup irradiates the optical disk, which has been loaded into the driving mechanism, with a converged light beam and generates an electrical signal based on the light that has been reflected from the optical disk. The control section includes a right/wrong side determining section for determining whether or not the optical disk that has been loaded into the driving mechanism (which will be sometimes referred to herein as an "optical disk loaded") has the other surface opposed to the optical pickup. It should be noted that the situation where the other surface of the optical disk loaded is opposed to the optical pickup is a so-called "erroneously loaded state" in which the read/write operations cannot be performed properly.

The optical pickup for use in the present invention may have a known configuration. More specifically, the optical pickup includes a semiconductor laser that emits the light beam, a lens that converges the light beam, an actuator for controlling the position of the lens, and a photodetector to receive the light beam that has been reflected from the optical disk and generate various types of electrical signals. Based on those electrical signals generated by the optical pickup, a focus error (FE) signal, a tracking error (TE) signal and a radio frequency (RF) signal are generated.

EMBODIMENTS

Hereinafter, an initial basic operation to be performed by the optical disk drive of this preferred embodiment will be outlined with reference to FIGS. 6A and 6B. FIG. 6A schematically illustrates three information storage layers that are located at three different depths. FIG. 6B is a flowchart outlining the initial basic operation. It should be noted that FIG. 6A does not illustrate the cross-sectional structure of a single optical disk but shows the relative positions of information storage layers in the optical disks of three different types (i.e., the depths of those layers as measured from the light incoming side thereof) on the single paper. The optical disk drive of this preferred embodiment is designed so as to read data from any of CDs, BDs and DVDs.

After the optical disk has been loaded into the optical disk drive, a light beam to read BDs is selected first and converged on the innermost area of the optical disk as shown in FIG. 6B. It will be described in detail later why the recognizing operation is carried out on the innermost area.

According to this preferred embodiment, first, in Step S1 shown in FIG. 6B, it is determined whether or not the optical disk loaded is one of a BD and an erroneously loaded CD. More specifically, as shown on the left-hand side of FIG. 6A, the optical disk is irradiated with a blue violet light beam 64 with a wavelength of about 405 nm through a lens 62 for BDs. If the focus finding operation described above is complete when the blue violet light beam 64 is focused at a level of about 0.1 mm under the light incoming side of the optical disk, then it can be seen that the optical disk loaded has an information storage layer at a shallow level as measured from the light incoming side. Thus, it can be seen that the optical disk loaded is either a properly loaded BD or an erroneously loaded CD. In that case, the process advances to Step S2 as shown in FIG. 6B, in which the operation of recognizing the optical disk loaded as either a properly loaded BD or an erroneously loaded CD (which will be referred to herein as "right/wrong side determining operation I") is carried out. This operation will be described more fully later.

Next, what if the focus finding operation has not been completed in the innermost area of the optical disk and at the depth of about 0.1 mm (i.e., suppose the answer to the query of Step S1 shown in FIG. 6B is NO). In that case, the optical disk loaded is neither a properly loaded BD not an erroneously loaded CD. That is to say, the optical disk loaded is one of a properly loaded DVD, an erroneously loaded DVD, a properly loaded CD and an erroneously loaded BD.

If the optical disk loaded is either a properly loaded CD or an erroneously loaded BD, then there will be an information storage layer at a relatively deep level (of about 1.1 mm) as measured from the light incoming side. On the other hand, if the optical disk loaded is a DVD, there will be an information storage layer at a depth of about 0.6 mm as measured from the light incoming side, no matter whether the DVD has been loaded upside up or upside down.

That is why according to this preferred embodiment, the light beam to read BDs is changed into a light beam to read CDs in Step S3 shown in FIG. 6B, thereby determining whether or not there is an information storage layer at the deep level under the light incoming side. That is to say, the lens 62 for BDs is replaced with a lens 66 with a long focus length to read CDs as shown in FIG. 6A, thereby forming a focal point of a near infrared laser beam 68 at a relatively deep level under the light incoming side of the optical disk loaded.

Next, the process advances to Step S4 shown in FIG. 6B, in which the focus finding operation is tried at the level of approximately 1.1 mm under the light incoming side. If the focus finding is accomplished in this processing step (i.e., if the answer is YES), then it can be determined that the optical disk loaded is one of a properly loaded CD and an erroneously loaded BD. To recognize the optical disk loaded as either a properly loaded CD or an erroneously loaded BD, however, the process advances to Step S5 to carry out the operation (i.e., right/wrong side determining operation II) to be described more fully later.

If the focus finding has not been accomplished at the level of approximately 1.1 mm under the light incoming side but at a level of approximately 0.6 mm, then the optical disk loaded can be recognized as a DVD. In that case, the process advances to Step S6, in which the light beam to read CDs is changed into a light beam to read DVDs. And then the operation of determining whether the DVD has been loaded upside up or upside down (i.e., right/wrong side determining operation III) is carried out in Step S7 as will be described in detail later.

This series of operations are carried out to roughly recognize the type of the optical disk loaded by sensing the depth of the information storage layer. In this preferred embodiment, considering that the optical disk may have been loaded upside down, the series of operations are carried out in the area where the presence of the label layer is not a problem (i.e., in the innermost area of the optical disk). The reason why the focus finding operation is performed in the innermost area of the optical disk will be described below.

An optical disk normally has a hole (with a radius of approximately 18 mm) at the center and has a lead-in area, a data zone, and a lead-out area, which are ring-like concentric zones that are arranged in this order from vicinity of the edge of the hole. In BDs, a burst cutting area (BCA) is arranged inside of the lead-in area. The BCA is a barcode like structure, which is provided to store cryptographic key and other copyright protection information on an optical disk but is not provided for CDs.

FIG. 7 schematically shows the ranges of respective storage areas on a BD by the distances as measured from the center of the disk. As can be seen from FIG. 7, the BCA and the lead-in area are arranged between 21 mm and $dzi/2$ mm away from the center of the disk, where $dzi$ is greater than 47.8 mm but smaller than 48.0 mm. If $dzi=48$ mm, the boundary between the lead-in area and the data zone is 24 mm away from the center of the disk. In CDs, the boundary between the lead-in area and the data zone is 25 mm away from the center of the disk.

The data zone is located between $dzi/2$ and $dz0/2$ mm away from the center of the disk. $dz0$ is equal to or smaller than 116.2. The lead-out area is located between $dz0/2$ and 58.5 mm away from the center of the disk.

In a preferred embodiment of the present invention, the focus finding operation is performed on a ringlike area located between 21 mm and 26 mm away from the center of the disk. This area will be referred to herein as the "innermost area of the optical disk". It should be noted that the "center of the disk" does not refer to the center of the optical disk rotating in the optical disk drive but to that of the optical disk in rest position. When the driving mechanism of the optical disk drive clamps the optical disk, normally the center of the disk is not exactly aligned with, but has some deviation from, the axis of rotation. According to the present invention, the innermost area is defined by the distance from the center of the disk as described above.

The focus finding operation is performed on that innermost area of the optical disk in order to prevent the label layer of the optical disk from interfering with the incoming light beam. As shown in FIG. 7, the BCA and lead-in area are included in the innermost area of the optical disk. In the prior art, the focus finding operation is performed on the data zone. And the label layer, which will affect the transmission of the light, is usually present over the data zone.

To perform the focus finding operation on the innermost area of the optical disk, the optical pickup needs to be moved to the innermost area. More specifically, in performing a traverse operation to bring the optical pickup close to the center of the shaft of a disk motor, the optical pickup is moved to its movable limit. It should be noted that the disk motor of an optical disk drive is sometimes provided with an inside stopper, which is molded of a resin or rubber, for example, to avoid collision with the optical pickup or a transport stage. In that case, the traverse operation is carried on until some movable member such as the optical pickup contacts with the inside stopper. Also, the optical disk drive may sometimes be provided with an inside switch, which is turned ON mechanically by making a contact with a movable member such as the optical pickup when the member comes closest to the center of the shaft of a disk motor. Then, the traverse operation is carried on until the inside switch is turned ON.

According to this preferred embodiment, by continuing the traverse operation until the optical pickup contacts with either the inside stopper or the inside switch, the area that is affected least by the label layer (i.e., the innermost area) can be irradiated with the light beam and the focus finding operation can be carried out on that area.

Optionally, after the traverse operation has been carried on until the optical pickup contacts with either the inside stopper or the inside switch, the optical pickup may be moved toward the outer edge of the disk. The center of the optical disk mounted on the disk motor is not exactly aligned with that of the rotating disk motor. That is why in the area where the optical pickup has contacted with the inside stopper or the inside switch, the light beam may shift from the innermost area of the optical disk toward the disk hole. For that reason, the disk radial position of the optical pickup is preferably adjusted such that the light beam always falls within the innermost area. For example, even if the light beam is targeted at a location that is 22.6 mm away from the center of the optical disk, the light beam may actually irradiate an area that is closer to the center of the disk than the innermost area is due to the degree of eccentricity of the disk and the traverse shift error of the optical pickup. Consequently, according to this preferred embodiment, the position of the optical pickup is controlled such that the light beam is targeted at a location that is 22 mm to 24 mm away from the center of the disk. Also, in this preferred embodiment, the recognition operation described above is started when the optical pickup contacts with the inside switch. At this time, the light beam is targeted at a location that is 22.6 mm away from the center of rotation of the optical disk.

Next, the configuration of the optical disk drive of this preferred embodiment will be described before the respective right/wrong side determining operations I, II and III are described.

Configuration of Optical Disk Drive

Hereinafter, a preferred embodiment of an optical disk drive according to the present invention will be described in detail with reference to FIG. 8, which shows an exemplary basic configuration for an optical disk drive 100 according to this preferred embodiment.

The basic configuration of the optical disk drive 100 shown in FIG. 8 is roughly classified into an optical pickup 30, a driving section 40, an optical disk controller (ODC) 50, and a disk motor 120. In the optical disk drive of this preferred embodiment, the ODC 50 functions as a right/wrong side determining section for determining, by reference to an electrical signal supplied from the optical pickup 30, whether the given optical disk has been loaded upside up or upside down.

The optical pickup 30 includes an optical system for irradiating the information storage layer (not shown in FIG. 8) of the given optical disk 102 with a light beam. In response to a drive signal supplied from the driving section 40, the optical pickup 30 adjusts its optical system, receives the light beam that has been reflected from the optical disk 102 in predetermined photosensitive areas, and outputs a signal representing the intensities of the light received in the photosensitive areas.

The ODC 50 controls the main operations of the optical disk drive 100. Specifically, in response to the output signals of the optical pickup 30, the ODC 50 generates a control signal, thereby shifting the focal point of the light beam to the information storage layer of the optical disk 102 and performing a focus control and a tracking control. Furthermore, the ODC 50 reads data from the optical disk 102, makes error correction and other processing on the data, and outputs it as a read signal.

In response to the control signal supplied from the ODC 50, the driving section 40 generates a drive signal and supplies it to the optical pickup 30. The disk motor 120 spins the optical disk 102 at a predetermined rotational velocity.

Hereinafter, these components will be described in further detail.

The optical pickup 30 includes a light source 122, a coupling lens 123, a focus actuator 124, an objective lens 126, a tracking actuator 128, a polarization beam splitter 130, a condenser lens 132, a photodetector 134, and adders 136, 138, 140, 142 and 181.

The light source 122 includes a semiconductor laser that radiates a light beam. Only one light source 122 is shown in FIG. 8 for the sake of simplicity. Actually, however, the light source may be made up of three semiconductor laser chips that radiate light beams with mutually different wavelengths. More specifically, the single optical pickup includes three semiconductor lasers that radiate light beams with mutually different wavelengths to read CDs, DVDs and BDs, respectively. However, those lasers are shown in FIG. 8 as a single light source 122 for the sake of simplicity.

FIG. 12(a) illustrates an exemplary optical pickup that includes three laser chips (not shown) with mutually different oscillation wavelengths and that can selectively use three objective lenses 150-1, 150-2 and 150-3. FIG. 12(b) is a top view of the optical pickup shown in FIG. 12(a).

Figure 12:
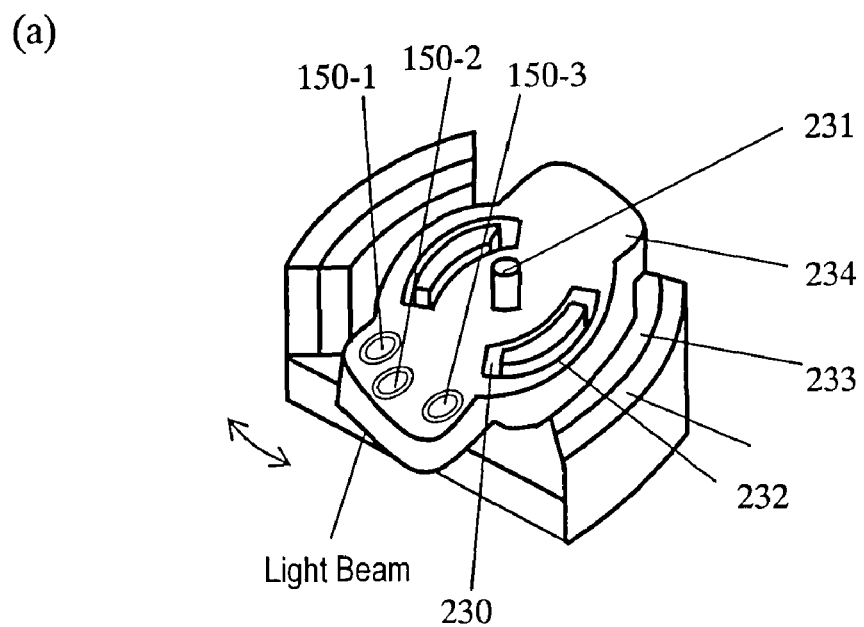
Figure 12:
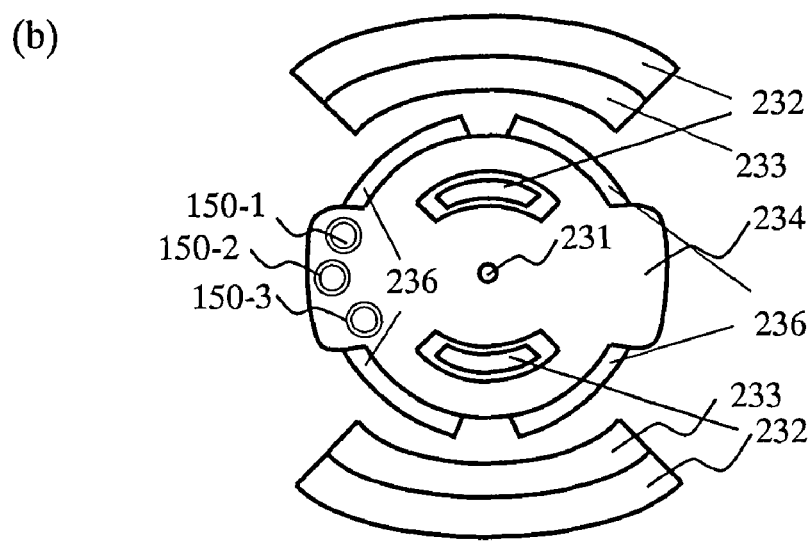

The optical pickup shown in FIG. 12 includes a holder 234, a plurality of objective lenses 150-1, 150-2 and 150-3, a shaft 231, a yoke 232, a focus coil 230 and a tracking coil 236. The holder 234 is arranged so as to turn freely on the shaft 231. The objective lenses 150-1, 150-2 and 150-3 are embedded in the holder 234 such that one of these lenses can be selectively used by turning the holder 234 to a predetermined degree. The number of the objective lenses 150-1, 150-2 and 150-3 does not have to be three but may also be two, or more than three.

The yoke 232 is arranged inside the openings of the holder 234 and outside of the holder 234. Inside the outside portions of the yoke 232, magnets 233 are arranged such that the same poles face each other. Under the holder 234, the focus coil 230 is wound and the flat tracking coil 236 is arranged. A magnetic circuit, made up of the focus coil 230, the tracking coil 236, the magnets 233 and the yoke 232, moves the objective lenses 150-1, 150-2 and 150-3 perpendicularly and parallel to the optical disk. Also, this magnetic circuit can turn the holder 234 to a predetermined degree.

The optical pickup for use in this preferred embodiment does not have to have the configuration shown in FIG. 12 but may have any other configuration.

FIG. 8 is referred back to.

The coupling lens 123 transforms the light beam emitted from the light source 122 into parallel light. The polarization beam splitter 130 reflects the parallel light that has come from the coupling lens 123. Since the positions of the semiconductor laser chips and the wavelengths of the light beams radiated are different from each other, the best arrangement of the optical system changes with the position and wavelength selected. That is why the arrangement of the optical pickup 30 is actually more complicated than the illustrated one. However, this fact itself is already well known in the art and the description thereof will be omitted herein.

The focus actuator 124 changes the positions of the objective lens 126 substantially perpendicularly to the information storage layer of the optical disk 102. On the other hand, the tracking actuator 124 changes the positions of the objective lens 126 substantially parallel to the information storage layer of the optical disk 102.

The objective lens 126 converges the light beam that has been reflected from the polarization beam splitter 130, thereby forming a focal point on the information storage layer of the optical disk 102. At this time, a light beam spot is formed on the information storage layer. The light beam that has been reflected from the optical disk 102 passes the objective lens 126 and the polarization beam splitter 130.

The condenser lens 132 converges the light that has been reflected from the optical disk 102 and then passed through the objective lens 126 and the polarization beam splitter 130 onto the photodetector 134. On receiving the light that has passed through the condenser lens 132, the photodetector 134 converts its optical signal into an electrical signal (such as a current signal). The photodetector 134 may have quadruple photosensitive areas, for example.

The ODC 50 includes differential amplifiers 158, 160, a digital signal processor (DSP) 162, gain switchers 164, 166 and analog-to-digital (A/D) converters 168, 170.

The differential amplifier 158 receives the outputs of the adders 136 and 138 and outputs an FE signal, which is a signal for controlling the optical pickup such that the light beam has a predetermined converging state on the information storage layer of the optical disk 102. The FE signal may be detected by any method—by an astigmatism method, a knife edge method or even a spot sized detection (SSD) method. The circuit configuration may be changed appropriately according to the detection method adopted.

The differential amplifier 160 receives the outputs of the adders 140 and 142 and outputs a TE signal, which is a signal for controlling the optical pickup such that the light beam follows the target track on the optical disk 102. The TE signal may be detected by any method—by a phase shift method, a push-pull method or even a three-beam method. The circuit configuration may be changed appropriately according to the detection method adopted.

In response to the TE signal, the DSP 162 may apply a control signal for tracking control to the driver 150. Also, in response to the FE signal, the DSP 162 may apply a control signal for focus control to the driver 148. The operation of the DSP 162 that constitutes the essential feature of the present invention will be described in detail later.

The gain switcher 164 adjusts the amplitude of the FE signal to a predetermined gain. The A/D converter 168 converts the output signal of the gain switcher 164 into a digital signal and then outputs the signal to the DSP 162. On the other hand, the gain switcher 166 adjusts the amplitude of the TE signal to a predetermined gain. The A/D converter 170 converts the output signal of the gain switcher 166 into a digital signal and then outputs the signal to the DSP 162.

The driving section 40 includes drivers 148 and 150. On receiving a control signal from the DSP 162, the driver 148 applies a drive signal associated with the control signal to the focus actuator 124, thereby driving the actuator 124. On receiving a control signal from the DSP 162, the driver 150 applies a drive signal associated with the control signal to the tracking actuator 128, thereby driving the actuator 128.

The output of the photodetector 134 is also supplied to the adder 181 and then passed through a high-pass filter 182, an equalizer (EQ) 183, a digitizing section 184 and an ECC/demodulating section 185, thereby generating an RF signal. The RF signal represents a local variation in the reflectance of the information storage plane of the optical disk 102 and is used to read address information and user data.

In the optical disk drive of this preferred embodiment, the ODC 50 functions as a right/wrong side determining section as described above. A memory of the optical disk drive stores a program for instructing respective components of the optical disk drive to perform a series of operations to be described below. And the ODC 50 controls the operations of the respective components of the optical disk drive in accordance with that program.

Right/Wrong Side Determination

Next, a series of operations to be done in this preferred embodiment to determine whether the disk has been loaded upside up or upside down will be described.

(Erroneously Loaded CD or Properly Loaded BD)

Suppose the optical disk loaded has turned out to be one of a properly loaded BD and an erroneously loaded CD as a result of the procedure that has been described with reference to FIGS. 6A and 6B. In that case, the operations to be described below are carried out. These operations correspond to the right/wrong side determining operation I of Step S2 shown in FIG. 6B.

Referring to FIG. 9A, first, in the innermost area of the optical disk loaded, the light beam is focused by a BD light source at a depth of approximately 0.1 mm as measured from the surface of the optical disk, thereby performing a focus finding operation (in Step S31). There usually is no label layer in the innermost area of the optical disk. That is why even if the optical disk has been loaded upside down, the focus servo controlled state can be maintained without being interfered with by the label layer. If the focus has been found successfully, the process advances to Step S32, in which the beam spot is shifted outward in the radial direction of the optical disk within the innermost area. Next, in Step S33, it is determined whether or not abnormal focus jump or loss of focus control has occurred. If the answer is YES, the optical disk is recognized as an erroneously loaded CD. The reason is that if an erroneously loaded CD is irradiated with a light beam using a BD optical system, the aberration will increase so much that the abnormal focus jump or loss of focus control occurs frequently. As a result, such an erroneously loaded CD can be detected easily.

FIG. 9B is a graph showing the waveforms of focus error signals to be generated when the respective storage layers of a properly loaded BD and an erroneously loaded CD are irradiated with a light beam to read BDs. As can be seen from FIG. 9B, a large S-curve was observed in the properly loaded BD but no S-curve was observed in the erroneously loaded CD and the waveform of its focus error signal is distorted significantly. This is because the BD optical system is designed so as to produce the smallest aberration on the storage layer of a properly loaded BD (with a depth of about 100 µm as measured from the surface). Thus, with respect to the storage layer of an erroneously loaded CD (with a depth of about 20 µm to about 40 µm as measured from the other surface of the CD), the BD optical system would produce too much aberration to generate a focus error signal properly. If no S-curve were observed in the focus error signal, the focus servo could not be activated. In that case, the focus finding operation would either simply fail or cause an abnormal focus jump or loss of focus control easily even if the focus had been found once.

As can be seen, even though the distances from the light incoming side of a properly loaded BD and an erroneously loaded CD to their respective storage layers are relatively close to each other, a huge aberration would be produced if the optical system designed exclusively for BDs focused a light beam on the storage layer of the erroneously loaded CD. As a result, on the erroneously loaded CD, abnormal focus jump or loss of focus control would occur frequently. Consequently, if abnormal focus jump or loss of focus control was caused by using the BD optical system, then the answer to query of Step S33 shown in FIG. 9A is YES and the given optical disk can be recognized as an erroneously loaded CD.

On the other hand, if neither abnormal focus jump nor loss of focus control has occurred in Step S33 and if no abnormality has been detected in the focus servo control (i.e., if the answer is NO), then the process advances to Step S34. At this point in time, the optical disk loaded may be recognized as a properly loaded BD. According to this preferred embodiment, however, the process advances to Step S34 of determining, by reference to the RF signal, whether or not the optical disk has a BCA for the purpose of confirmation. If the answer is YES, the optical disk can be determined as a properly loaded BD. If the answer is NO, the optical disk can be determined as an erroneously loaded CD.

Next, it will be described what if the focus finding operation has failed in Step S31. If the focus finding operation on the innermost area of the optical disk has failed a predetermined number of times or more, the light beam spot is shifted in the disk radial direction within the innermost area of the optical disk (in Step S35) and then the focus finding operation is retried (in Step S36). In this preferred embodiment, the focus finding operation is retried three more times. But if the focus finding operation still fails, the optical disk loaded is recognized as an erroneously loaded CD. On the other hand, if the focus finding operation has succeeded, then the process advances to Step S34 to see if the optical disk has a BCA, thereby determining the given optical disk as a properly loaded BD or an erroneously loaded CD.

Optionally, in Step S35, the light beam spot may reach the user area instead of staying within the innermost area. If the optical disk has been loaded upside down, shifting the light beam spot to the user area will make the light beam cross the label layer, thus interfering with the focus finding operation. That is why if the light beam spot is shifted to the user area in Step S35, it can be determined reliably whether the optical disk loaded is an erroneously loaded CD or a properly loaded BD.

However, if an erroneously loaded CD is irradiated with a light beam by using a BD optical system, then the aberration will increase as described above. Therefore, if a CD has been loaded upside down, the chances of getting the focus finding operation done successfully are very slim even where there is no label layer. That is why if the focus finding operation has failed a number of times (e.g., three times) at different locations within the innermost area, the optical disk loaded may be recognized as an erroneously loaded CD. In that case, there is no need to shift the light beam spot to the user area in Step S35.

In the example that has just been described with reference to FIG. 9A, it is determined in Step S34 whether the optical disk has a BCA or not. However, this processing step S34 is not an indispensable one. Alternatively, processing steps S37 and S38, corresponding to the processing steps S32 and S33, respectively, may be carried out instead of the processing step S34 of detecting a BCA as shown in FIG. 9C. In that case, the light beam spot is shifted again in the radial direction in Step S37 and then it is determined in Step S38 whether or not abnormal focus jump or loss of focus control has occurred. If the answer is YES, the optical disk loaded may be determined as an erroneously loaded CD. On the other hand, if the answer is NO, then the optical disk loaded may be determined as a properly loaded BD.

As described above, if a CD has been loaded upside down, focus errors are very likely to occur. The reason is that every time the light beam spot being shifted crosses a track groove, the focus error signal varies significantly. Also, as the objective lens shakes due to the acceleration or deceleration of the optical pickup, the focus control cannot be carried out properly anymore. That is why there is little need to perform the operation of detecting a BCA just to determine whether the optical disk loaded is an erroneously loaded CD or not.

(Erroneously Loaded BD or Properly Loaded CD)

Suppose the optical disk loaded has turned out to be one of a properly loaded CD and an erroneously loaded BD as a result of the procedure that has been described with reference to FIGS. 6A and 6B. In that case, the operations to be described below are carried out. These operations correspond to the right/wrong side determining operation II of Step S5 shown in FIG. 6B.

Referring to FIG. 10A, first, in the innermost area of the optical disk loaded, the light beam is focused by a CD light source at a depth of approximately 1.1 mm as measured from the surface of the optical disk, thereby performing a focus finding operation (in Step S11).

As described above, there usually is no label layer in the innermost area of the optical disk. That is why even if the optical disk has been loaded upside down, the focus servo controlled state can be maintained without being interfered with by the label layer. If the focus has been found successfully, the process advances to Step S12, in which the beam spot is shifted outward in the radial direction of the optical disk within the innermost area. Normally, there is a track in the innermost area of an optical disk. However, if the optical disk has some eccentricity, no tracks may be present where the focus finding operation has been carried out. That is why in Step S12, the beam spot is shifted within the innermost area, thereby making it easier to generate a TE signal.

Next, the optical disk is rotated to generate a TE signal. In Step S13, it is determined whether or not abnormal focus jump or loss of focus control has occurred. If the answer is YES, the optical disk is recognized as an erroneously loaded BD.

As described above, if an erroneously loaded CD is irradiated with a light beam to read BDs, the S-curve of the resultant focus error signal will have its amplitude decreased so much as to cause loss of focus control frequently. As a result, such an erroneously loaded CD can be recognized easily. The present inventors discovered via experiments that a similar phenomenon also happened when an erroneously loaded BD was irradiated with a light beam to read CDs. Specifically, the storage layer of a normal CD is located at a depth of about 1.2 mm (as measured from the light incoming side), whereas that of an erroneously loaded BD is located at a depth of about 1.1 mm (as measured from the light incoming side). That is to say, there is a level difference between these two layers. That is why if an erroneously loaded BD is irradiated with a light beam to read CDs, small aberration will be produced to distort the S-curve of the focus error signal. Also, since the reflectance of the storage layer has wavelength dependence, the focus error signal has decreased amplitude, too. For these reasons, if an erroneously loaded BD is irradiated with a light beam to read CDs, loss of focus control is likely to occur. Consequently, the erroneously loaded BD can be recognized quickly because abnormal focus jump or loss of focus control is very likely to occur in Step S13 when a BD is loaded upside down.

If neither abnormal focus jump nor loss of focus control has occurred and if no abnormality has been detected in the focus servo control (i.e., if the answer is NO), then the process advances to Step S16, in which the beam spot is shifted to outside of the innermost area of the optical disk. Then, in Step S17, it is determined whether or not there is any abnormality in the TE signal or the focus servo control.

If the optical disk loaded is a CD, then the TE signal is generated appropriately. When a light beam to read CDs is used, a beam spot of a relatively large size is formed on the information storage layer of the optical disk. The size is defined so as to generate an appropriate signal from any of the tracks that are arranged at a pitch of 1.6 µm. However, BDs have a track pitch of 0.32 µm, which is much smaller than that of CDs (1.6 µm). For that reason, if the optical disk loaded is an erroneously loaded BD, the light beam spot formed on its information storage layer is too large to stay within a single track. As a result, the beam spot covers multiple tracks and no TE signal can be generated appropriately.

Therefore, if there is no abnormality in the TE signal (i.e., if the answer is NO), it can be determined that a CD has been loaded properly. On the other hand, if there is any abnormality (e.g., if no TE signal has been generated), then it can be determined that a BD has been loaded upside down. In the latter case, the rotation of the optical disk is stopped.

The abnormality of a TE signal can be detected by determining whether or not the amplitude of the TE signal is greater than a preset value or by evaluating the degree of symmetry of the TE signal, for example. Also, if the TE signal has a missing part corresponding to at least one track while the beam spot is shifted in the disk radial direction, the missing part should be caused by the label layer. In that case, the optical disk loaded may be recognized as a BD that has been loaded upside down.

Optionally, it can be determined whether the optical disk loaded is a properly loaded CD or an erroneously loaded BD by detecting a BCA by reference to an RF signal, instead of using the TE signal. No BCA is provided for CDs as described above. That is why if a BCA has been detected, then the optical disk loaded may be recognized as an erroneously loaded BD. The BCA may be obtained by forming a plurality of slits through a metal film, for example, and appears as a significant variation in the amplitude of an RF signal. For that reason, even if a BD has been loaded upside down, its BCA can still be detected easily. Also, the BCA can be detected easily even if the beam spot size is as large as that of a light beam to read CDs.

As described above, if the focus finding operation has got done within the innermost area of the optical disk, the optical disk loaded may be determined as either a properly loaded CD or an erroneously loaded BD by reference to at least one of the TE and RF signals.

Next, it will be described what if the focus finding operation has failed in Step S11. If the focus finding operation on the innermost area of the optical disk has failed a predetermined number of times or more, the process advances to Step S14, in which the light beam spot is shifted in the disk radial direction within the innermost area of the optical disk, and then the focus finding operation is retried (in Step S15). If the focus finding operation still fails even after having been retried a number of times, the optical disk loaded is recognized as an erroneously loaded BD. On the other hand, if the focus finding operation has succeeded, then the process advances to Step S16 to determine, by reference to either the TE signal or the RF signal, whether the optical disk loaded is a properly loaded CD or an erroneously loaded BD according to the method described above.

Next, it will be described how to distinguish a dual type optical disk, in which a DVD's storage layer and a CD's storage layer are both included, from a BD.

Portion (a) of FIG. 10B is a cross-sectional view illustrating how to load a dual type optical disk in reading data from the CD's storage layer 14b thereof, while portion (b) of FIG. 10B is a cross-sectional view illustrating how to load the dual type optical disk in reading data from the DVD's storage layer 14a thereof. As shown in FIG. 10B, the dual type optical disk has no label layer. Thus, the disk needs to be turned over to change the target storage layers to read data from (i.e., from the DVD's storage layer 14a into the CD's storage layer 14b, or vice versa).

In a dual type optical disk, the distance from the surface of the optical disk that is opposed to the optical pickup to the CD's storage layer 14b is about 0.85 mm, which is much shorter than about 1.2 mm that is the distance from the surface of a normal CD to its storage layer. If there is such a short distance from the surface of the optical disk to the CD's storage layer 14b, abnormal focus jump will occur more frequently in reading data from the CD's storage layer 14b than in reading data from the storage layer of a normal CD.

Therefore, if such a dual type optical disk is loaded into the optical disk drive of this preferred embodiment in order to read data from the CD's storage layer thereof, abnormal focus jump will still occur even when the optical disk has been loaded properly. In that case, the optical disk may be recognized as an erroneously loaded BD by mistake.

In order to overcome such a problem, according to this preferred embodiment, the gain of the focus servo control is increased so much as to prevent the light beam being focused on the CD's storage layer 14b of the dual type optical disk from loss of focus control easily. As a result, when the CD's storage layer 14b of a dual type optical disk is facing the optical pickup, that optical disk will not be recognized as an "erroneously loaded BD" by mistake.

As described above, according to this preferred embodiment, even if the dual type optical disk has been loaded as shown in portion (a) of FIG. 10B, the optical disk is also recognized as a properly loaded CD. In that case, the focus position is preferably changed depending on whether the properly loaded CD is a normal CD or a dual type optical disk. The reason is that as the distance from the surface of the dual type optical disk that is opposed to the optical pickup to the CD's storage layer 14b is shorter than that of a normal CD as described above, the best signal can be obtained by slightly shifting the focal point of the light beam from the CD's storage layer 14b. In this preferred embodiment, the following operations are performed.

First, a light beam to read CDs is converged on the information storage layer of an optical disk that has been recognized as a properly loaded CD. If a normal TE output has been obtained and if the tracking control has been started as a result, the startup process is finished. On the other hand, if the TE output is too small or if the tracking control cannot be started, the position of the objective lens is controlled such that the focal point of the light beam to read CDs is shifted deeper into the optical disk. The focal point of the light beam may be shifted finely at a small step of 0.0625 µm, for example. And every time the focal point is shifted, it is determined whether a normal TE output has been obtained and whether the tracking control has been started. And when these conditions are satisfied, the startup process is finished.

By performing these operations, a signal of quality can be obtained no matter whether the optical disk loaded is a normal CD or a dual type optical disk (with its CD layer faced down). In the example described above, the focal point of the light beam is adjusted based on the TE output. Alternatively, the focal point may also be adjusted in a similar manner based on the amplitude of the RF signal.

(Erroneously Loaded DVD or Properly Loaded DVD)

Suppose the optical disk loaded has turned out to be one of a properly loaded DVD and an erroneously loaded DVD as a result of the procedure that has been described with reference to FIGS. 6A and 6B. In that case, the operations to be described below are carried out. These operations correspond to the right/wrong side determining operation III of Step S6 shown in FIG. 6B.

Referring to FIG. 11, first, the CD light source is switched into a DVD light source, and in the innermost area of the optical disk loaded, a light beam to read DVDs is focused at a depth of approximately 0.6 mm as measured from the surface of the optical disk, thereby performing a focus finding operation (in Step S21).

Since the optical disk loaded is a DVD in this case, the TE signal can be generated appropriately, no matter whether the optical disk has been loaded properly or erroneously. The TE signal inverts its polarities depending on whether the DVD is upside up or upside down. However, it is difficult to determine, by the polarity of the TE signal, which side is now facing the optical pickup.

That is why according to this preferred embodiment, the light beam spot is shifted in the disk radial direction from the innermost area of the optical disk toward the user area (in Step S22). If the optical disk has been loaded upside down, the light beam will cross the label layer in the user area. The optical transmittance or reflectance of the label layer changes from one location to another. Therefore, while the beam spot is shifted in the disk radial direction, abnormality will soon appear in the FE signal and the focus servo control will fail sooner or later. For that reason, it is determined if the focus control has any abnormality while shifting the light beam spot in the disk radial direction (in Step S23). In this case, if it has been sensed that the focus servo control is no longer working, then the optical disk loaded can be recognized as a DVD that has been loaded upside down. In that case, the rotation of the optical disk is stopped.

If it has been determined in Step S23 that the focus servo control is still working fine, the address is read in Step S24. Next, in Step S24, it is determined whether or not the address has been read properly from the user area. If the answer is YES, the optical disk loaded can be recognized as a properly loaded DVD. On the other hand, if the answer is NO, the optical disk loaded is recognized as an erroneously loaded DVD. Alternatively, the right/wrong side determination may also be made by seeing if data, not the address, has been read properly.

It should be noted that if a DVD has been loaded upside down, abnormality will appear not only in the FE signal but also in the TE signal while the beam spot is being shifted in the disk radial direction. Therefore, if the focus servo is still working fine, the upside down loading can also be sensed by detecting the abnormality of the TE signal.

Next, it will be described what if the focus finding operation has failed in the innermost area of the optical disk. If the focus finding operation on the innermost area of the optical disk has failed a predetermined number of times or more, the process advances to Step S26, in which the light beam spot is shifted toward the user area in disk radial direction within the innermost area of the optical disk. If the optical disk has been loaded upside down, the light beam will cross the label layer in the user area. Then, the focus finding operation is retried in Step S27. If the focus finding operation has failed, the optical disk loaded is recognized as a DVD that has been loaded upside down. On the other hand, if the focus finding operation has succeeded, then the beam spot is shifted to the user area in Step S22. And it is determined, by reference to either the TE signal or the RF signal, whether the optical disk loaded is a properly loaded DVD or an erroneously loaded DVD according to the method described above.

As described above, according to a preferred embodiment of the present invention, first, a focus finding operation is carried out in the innermost area of an optical disk, which is less likely affected by the label layer, and then the operation of determining whether the given optical disk has been loaded upside down or not is carried out. Thus, it is possible to avoid an unwanted situation where an optical pickup collides against an erroneously loaded optical disk and does damage on the disk.

In the preferred embodiments described above, the right/wrong side determining section is implemented by means of software. Alternatively, the right/wrong side determining section may be implemented by means of hardware or a combination of software and hardware as well.

Also, in the preferred embodiments described above, after the focus finding operation has been performed at least once, the upside down loading state of the optical disk is detected by reference to an FE signal, a TE signal and/or an RF signal. However, the upside down loading state of the optical disk may also be detected by any other method.

Furthermore, the preferred embodiments of the present invention described above relate to a method of determining whether a CD, a DVD or a BD has been loaded upside down or not. However, the present invention is also applicable to recognizing an optical disk that complies with any other standard. The number and depth of the information storage layer(s) are not limited to those adopted for the preferred embodiments described above, either.

Besides, the configuration of the optical disk drive shown in FIG. 8 is just an example. And the optical disk drive of the present invention may also have any other appropriate configuration.

The innermost area of an optical disk is defined herein as an area that is located between 21 mm and 26 mm away from the center of the disk and the focus finding operation is supposed to be performed within that area. In a BD, however, the boundary between the lead-in area and the data zone is 24 mm away from the center of the disk as described above. Thus, it is sometimes preferable to perform the focus finding operation in an area that is located between 21 mm and 24 mm away from the center of the disk.

In a dual type optical disk, on the other hand, target information storage layers need to be irradiated with light beams from both sides of the optical disk. That is why the label layer may sometimes be arranged less than about 21 mm away from the center of the disk or the title of the content stored on the optical disk and/or the artist's name may be printed there. Thus, an optical disk drive compatible with dual type optical disks can perform the focus finding operation without being interfered with by the label layer within an area that is located between 22 mm and 26 mm away from the center of the disk. In that case, the recognizing operation described above is preferably started after the optical pickup has been moved 1.0 mm outward from a position where the optical pickup is contacting with the inside switch. Then, the light beam is targeted at a location that is 23.6 mm away from the center of rotation of the optical disk.

INDUSTRIAL APPLICABILITY

The present invention provides an optical disk drive that can read and write data from/on various types of optical disks that were manufactured compliant with numerous standards, and also provides a method for driving such an optical disk drive. The optical disk drive of the present invention is particularly effective if the drive includes an optical pickup that can read and write data from an optical disk with an information storage layer at a shallow level such as a BD. Thus, the present invention can contribute greatly to popularizing next-generation optical disks.

The invention claimed is:

1. An optical disk drive having the ability to read data from multiple types of optical disks, each of which has a light-incoming side surface and a label side surface and at least one information storage layer arranged between the surfaces, the multiple types of the optical disks including a first type of optical disk and a second type of optical disk, the drive comprising:
   a driving mechanism, which is loaded with a selected one of the optical disks of the multiple types and which rotates the optical disk;
   an optical pickup for irradiating the optical disk, which has been loaded into the driving mechanism, with a converged light beam, thereby generating an electrical signal based on light that has been reflected from the optical disk, the optical pickup comprising a first light source for emitting a light beam for the first type of optical disk and a second light source for emitting a light beam for the second type of optical disk; and
   a control section for controlling operations of the driving mechanism and the optical pickup,
   wherein the control section controls a focusing operation of the optical pickup such that the focal point of the light beam for the first type of optical disk is located right on the information storage layer of the optical disk in the innermost area of the optical disk, and
   wherein after a focus servo control has been activated such that the focal point of the light beam for the first type of optical disk is located on the information storage layer of the optical disk, the control section moves the optical pickup in a disk radial direction while the focus servo control is being activated, and makes the driving mechanism stop the rotation of the optical disk if the optical disk which has been loaded into the driving mechanism is not the first type of optical disk properly loaded with the light-incoming side surface opposed to the optical pickup.

2. The optical disk drive of claim 1, wherein a first distance between the information storage layer of the first type of optical disk and the light-incoming side surface thereof is substantially equal to a second distance between the information storage layer of the second type of optical disk and the label side surface thereof.

3. The optical disk drive of claim 1, wherein the innermost area of the optical disk is located between 21 mm and 26 mm away from the center of the optical disk.

4. The optical disk drive of claim 1, wherein the control section makes the optical pickup irradiate the optical disk with a light beam to read BDs, moves the optical pickup in a disk radial direction while the focus servo control is being activated, and sees if loss of focus control has occurred, thereby determining whether the optical disk is a properly loaded BD or an erroneously loaded CD.

5. The optical disk drive of claim 1, wherein the control section makes the optical pickup irradiate the optical disk with a light beam to read BDs and detects a burst cutting area, thereby determining whether the optical disk is a properly loaded BD or an erroneously loaded CD.

6. The optical disk drive of claim 1, wherein the control section determines, by reference to a tracking error signal or a focus error signal generated by irradiating the optical disk with a light beam to read CDs, whether the optical disk is a properly loaded CD or an erroneously loaded BD.

7. The optical disk drive of claim 1, wherein the control section makes the optical pickup irradiate the optical disk with a light beam to read CDs and detects a burst cutting area, thereby determining whether the optical disk is a properly loaded CD or an erroneously loaded BD.

8. The optical disk drive of claim 6, wherein after the optical disk has been recognized as a properly loaded CD, the focal point of the light beam is moved deeper into the optical disk, thereby reading data from a dual type optical disk.

9. The optical disk drive of claim 1, wherein the control section makes the optical pickup irradiate the optical disk with a light beam to read DVDs, and moves the optical pickup in a disk radial direction while the focus servo control is being activated, thereby determining, by reference to a focus error signal or a tracking error signal, whether the optical disk is a properly loaded DVD or an erroneously loaded DVD.

10. The optical disk drive of claim 1, wherein the control section makes the optical pickup irradiates the optical disk with a light beam to read DVDs, moves the optical pickup in a disk radial direction while the focus servo control is being activated, and sees if an address is readable from a user area of the optical disk, thereby determining whether the optical disk is a properly loaded DVD or an erroneously loaded DVD.

11. The optical disk drive of claim 1, wherein the first type of optical disk and the second type of optical disk is a CD or a DVD.

12. A method for driving an optical disk drive having the ability to read data from multiple types of optical disks, each of which has a light-incoming side surface and a label side surface and at least one information storage layer arranged between the surfaces, the multiple types of the optical disks including a first type of optical disk and a second type of optical disk, the method comprising the steps of:
   (A) performing an operation to detect the information storage layer of the optical disk loaded by irradiating the innermost area of the optical disk with a light beam for the first type optical disk;
   (B) performing a focus servo control such that the focal point of the light beam for the first type of optical disk is located right on the information storage layer in the innermost area of the optical disk; and (C) moving the focal point of the light beam in a disk radial direction while the focus servo control is being activated, and stopping the rotation of the optical disk if the optical disk loaded is not the first type of optical disk properly loaded with the light-incoming side surface opposed to the optical pickup.

13. The method of claim 12, wherein the step (A) is carried out with the focal point of the light beam set between 21 mm and 26 mm away from the center of the optical disk.

14. The method of claim 13, wherein the step (B) is carried out with the focal point of the light beam set between 21 mm and 26 mm away from the center of the optical disk.

15. The method of claim 13, wherein the step (C) is carried out with the focal point of the light beam shifted in the disk radial direction.

16. The method of claim 14, wherein the step (C) includes shifting the focal point of the light beam within the area, checking the focus servo control for any abnormality, and shifting the focal point of the light beam again out of the area if no abnormality has been detected.

17. The method of claim 12, wherein a first distance between the information storage layer of the first type of optical disk and the light-incoming side surface thereof is substantially equal to a second distance between the information storage layer of the second type of optical disk and the label side surface thereof.

18. The method of claim 12, wherein the first type of optical disk and the second type of optical disk is a CD or a DVD.

* * * * *